US 6,651,498 B1

(12) United States Patent
Kikuchi et al.

(10) Patent No.: US 6,651,498 B1
(45) Date of Patent: *Nov. 25, 2003

(54) VIBRATORY GYROSCOPE, VIBRATOR USED IN THIS GYROSCOPE, METHOD FOR ANALYZING VIBRATION OF THE VIBRATOR, METHOD FOR SUPPORTING THE VIBRATOR, AND METHOD FOR MANUFACTURING THE VIBRATORY GYROSCOPE

(75) Inventors: Takayuki Kikuchi, Nagoya (JP); Shosaku Gouji, Ama-Gun (JP); Yukihisa Osugi, Nagoya (JP); Takao Soma, Nishikamo-Gun (JP); Yuji Fujiwara, Toyoake (JP)

(73) Assignee: NGK Insulators, Ltd., Nagoya City (JP)

( * ) Notice: Subject to any disclaimer, the term of this patent is extended or adjusted under 35 U.S.C. 154(b) by 208 days.

This patent is subject to a terminal disclaimer.

(21) Appl. No.: 09/607,077

(22) Filed: Jun. 29, 2000

Related U.S. Application Data

(63) Continuation-in-part of application No. 09/166,089, filed on Oct. 5, 1998, now Pat. No. 6,186,003.

(30) Foreign Application Priority Data

| Oct. 6, 1997 | (JP) | 9-287624 |
| Nov. 4, 1997 | (JP) | 9-316234 |
| Jan. 30, 1998 | (JP) | 10-32297 |
| Jun. 12, 1998 | (JP) | 10-179777 |
| Jul. 2, 1999 | (JP) | 10-188563 |

(51) Int. Cl.$^7$ .............................. G01P 9/04
(52) U.S. Cl. .................. 73/504.12; 73/504.16
(58) Field of Search ................. 73/504.02, 504.04, 73/504.12, 504.13, 504.14, 504.15, 504.16; 310/316, 326, 365, 370, 366

(56) References Cited

U.S. PATENT DOCUMENTS

| 4,930,351 A | | 6/1990 | Macy et al. | |
| 5,166,571 A | | 11/1992 | Konno et al. | |
| 5,313,835 A | | 5/1994 | Dunn | |
| 5,396,144 A | | 3/1995 | Gupta et al. | |
| 5,451,828 A | | 9/1995 | Tomikawa et al. | |
| 5,533,397 A | | 7/1996 | Sugitani et al. | |
| 5,585,562 A | | 12/1996 | Kurata et al. | |
| 5,708,320 A | * | 1/1998 | Ohnishi et al. | 310/321 |
| 5,757,107 A | * | 5/1998 | Wakatuki et al. | 310/370 |
| 5,763,781 A | | 6/1998 | Netzer | |
| 5,824,900 A | | 10/1998 | Konno et al. | |
| 6,186,003 B1 | * | 2/2001 | Kikuchi et al. | 73/504.12 |
| 6,194,817 B1 | * | 2/2001 | Yachi et al. | 310/370 |
| 6,389,897 B1 | * | 5/2002 | Tani et al. | 73/504.12 |

FOREIGN PATENT DOCUMENTS

| EP | 0 623 807 A1 | 11/1994 |
| EP | 0 638 783 A1 | 2/1995 |
| EP | 0 844 461 A2 | 5/1998 |
| JP | 62-217115 | 9/1987 |
| JP | 7-83671 | 3/1995 |
| JP | 8-128833 | 5/1996 |

* cited by examiner

Primary Examiner—Helen Kwok
(74) Attorney, Agent, or Firm—Burr & Brown

(57) ABSTRACT

A vibratory gyroscope for detecting a turning angular rate of rotation applied to a vibrator in a predetermined temperature range is disclosed. The vibratory gyroscope has a vibrator, a supporting member for supporting the vibrator and an adhesive portion made of an adhesive provided between the supporting member and the vibrator for bonding the vibrator to the supporting member. The vibratory gyroscope detects a turning angular rate based on a detecting vibration excited in the vibrator according to rotation when a driving vibration is excited in the vibrator. The adhesive has a tan δ not higher than 0.1 within the temperature range.

33 Claims, 26 Drawing Sheets

FIG_1
PRIOR ART
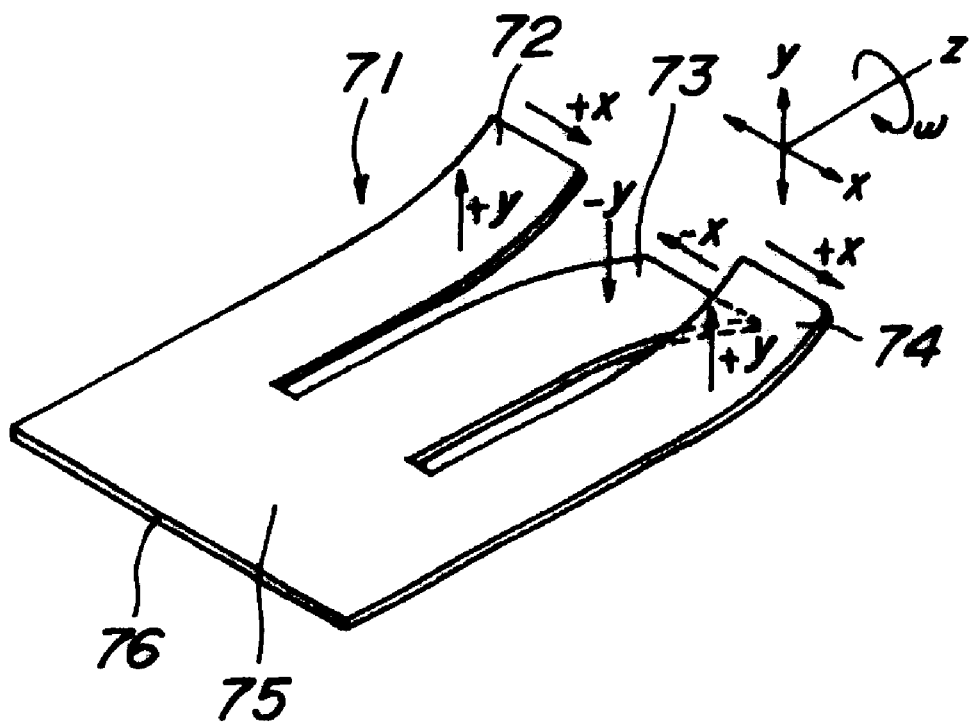

FIG_3a
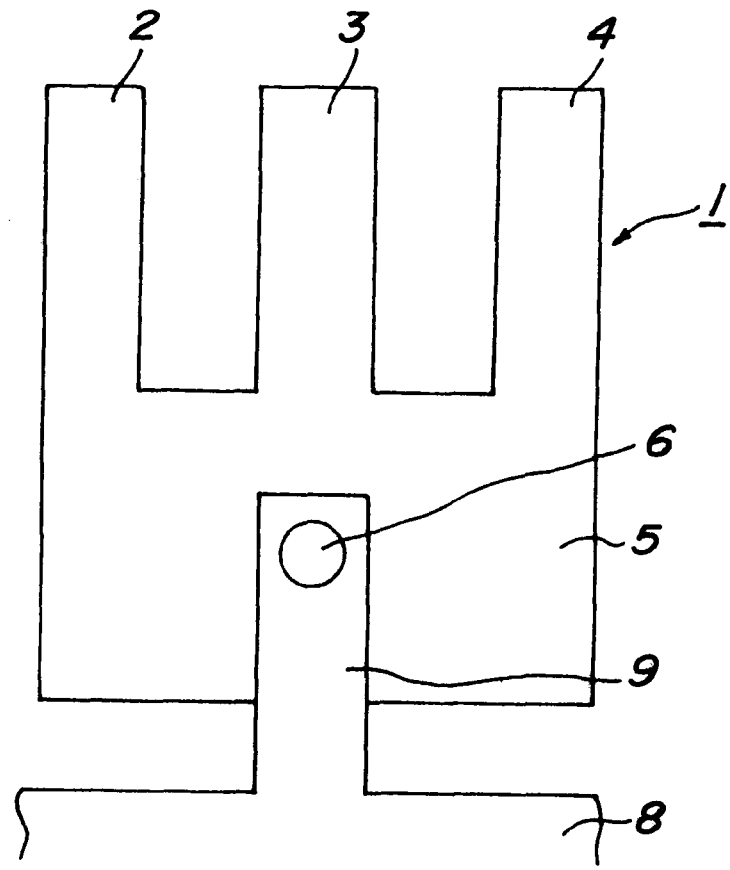
FIG_3b
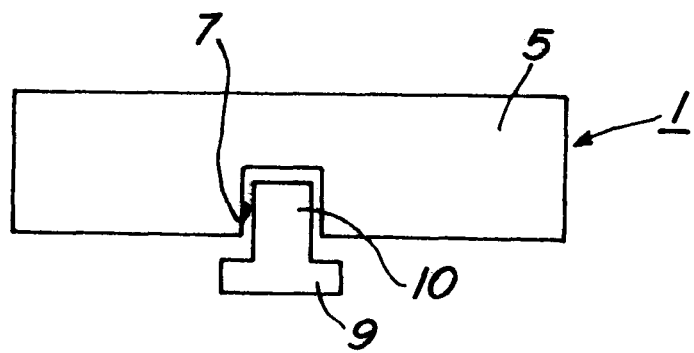

FIG_4
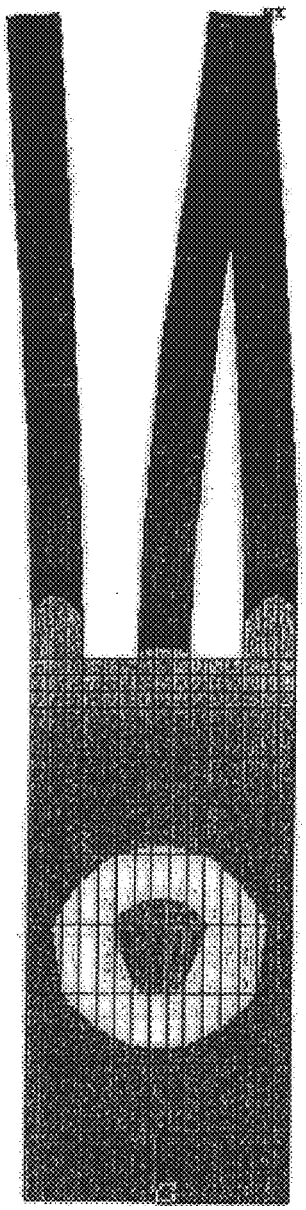
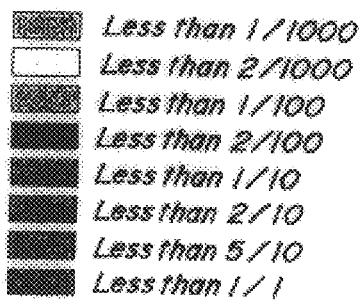
Distribution of vibration amplitudes obtained by a natural mode analysis of a face-parallel vibration
Ratio of amplitude at a domain to amplitude of the maximum vibration amplitude point
- Less than 1/1000
- Less than 2/1000
- Less than 1/100
- Less than 2/100
- Less than 1/10
- Less than 2/10
- Less than 5/10
- Less than 1/1

FIG. 5
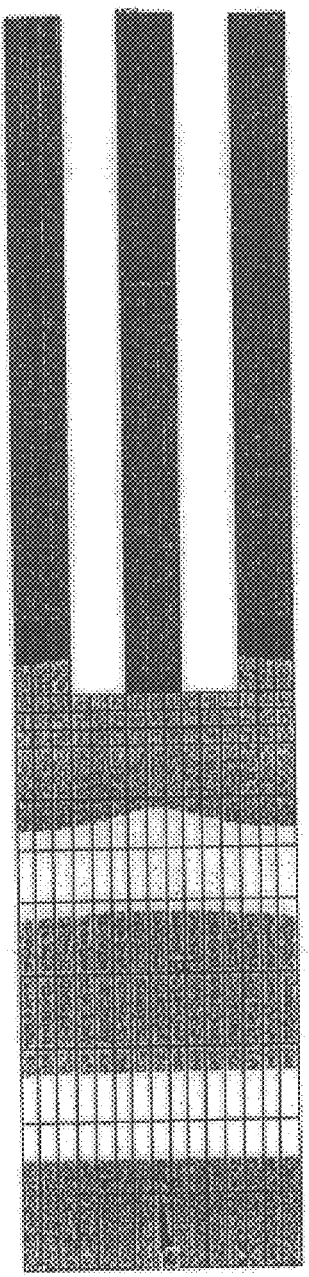
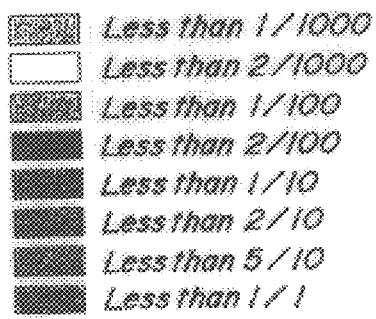
Distribution of vibration amplitudes obtained by a natural mode analysis of a face-normal vibration
Ratio of amplitude at a domain to amplitude at the maximum vibration amplitude point
- Less than 1/1000
- Less than 2/1000
- Less than 1/100
- Less than 2/100
- Less than 1/10
- Less than 2/10
- Less than 5/10
- Less than 1/1

FIG_6

FIG_12

FIG_15a
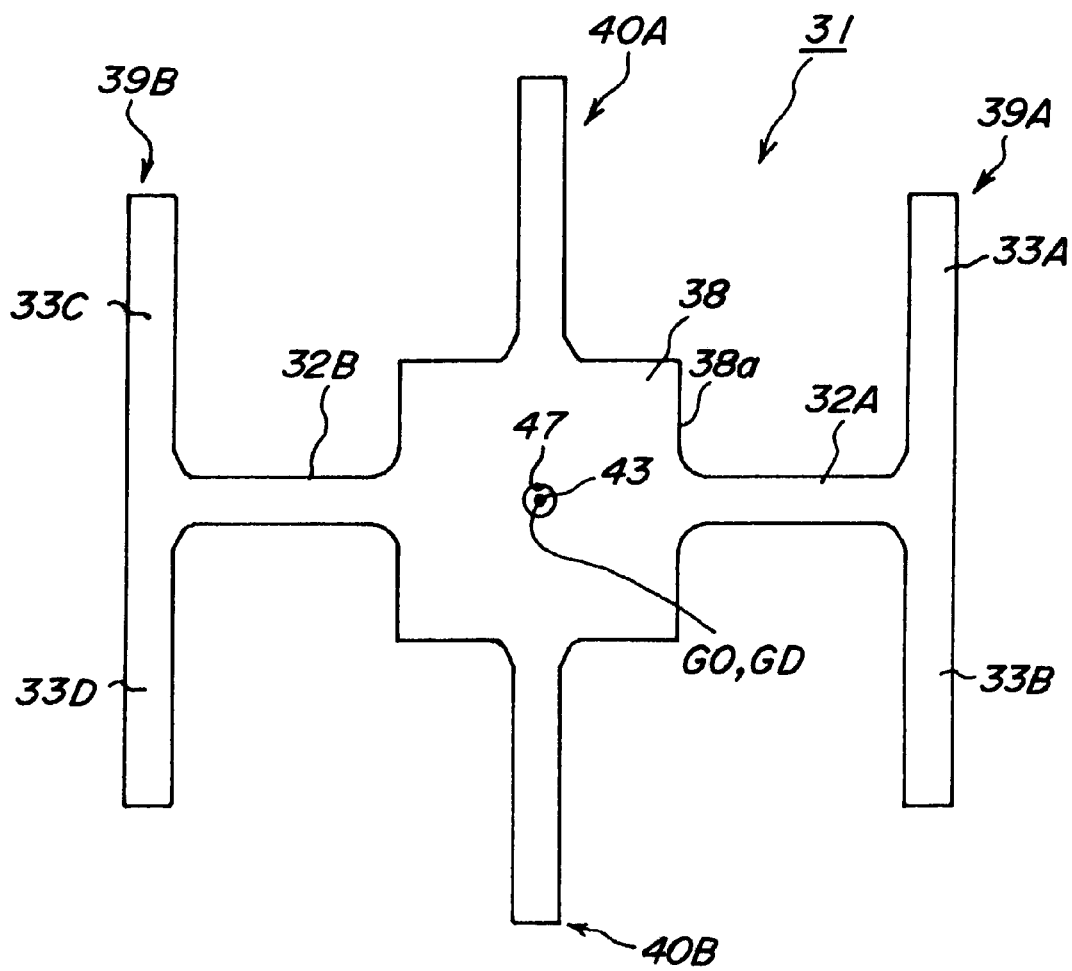
FIG_15b
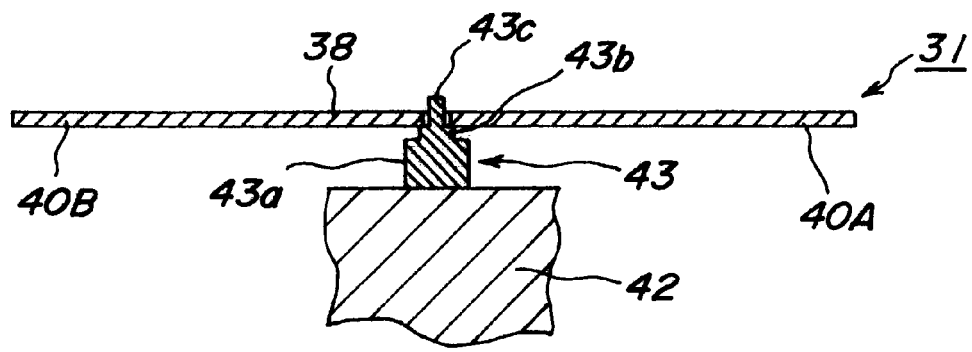

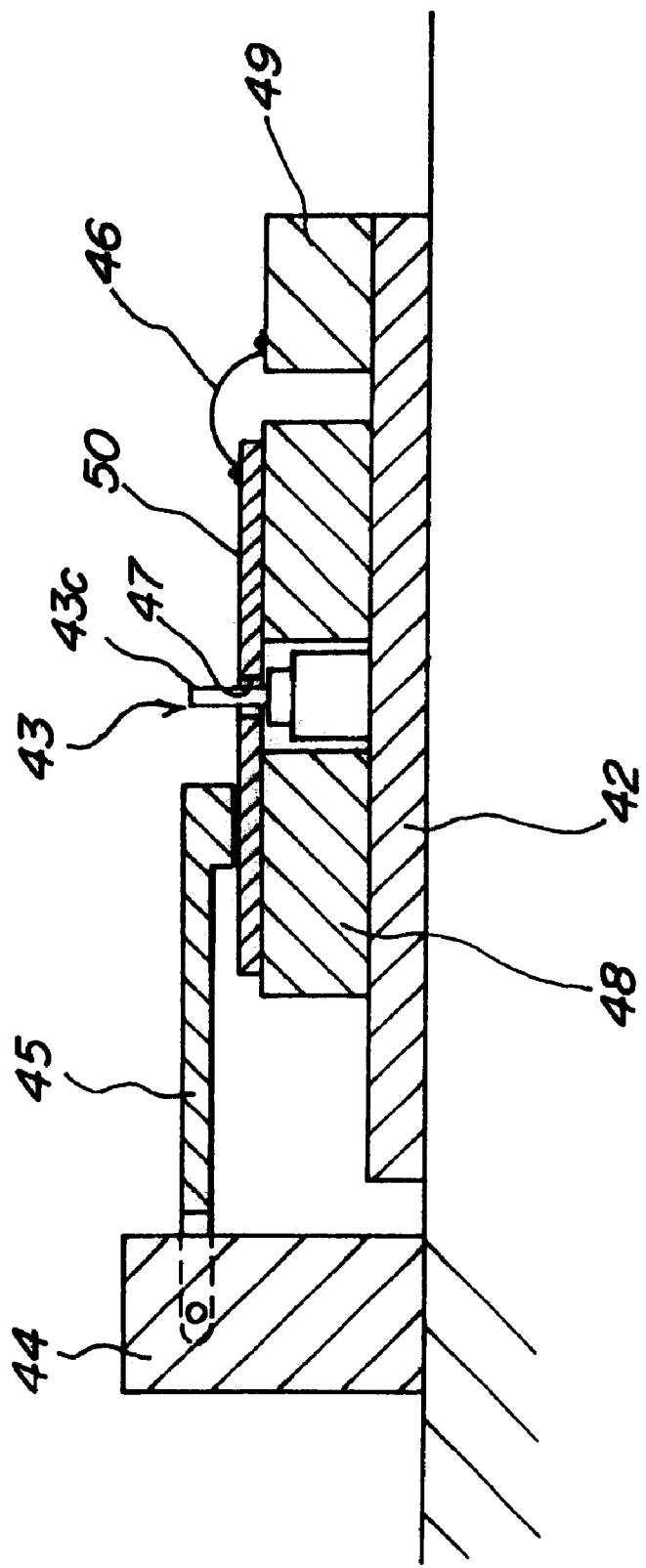

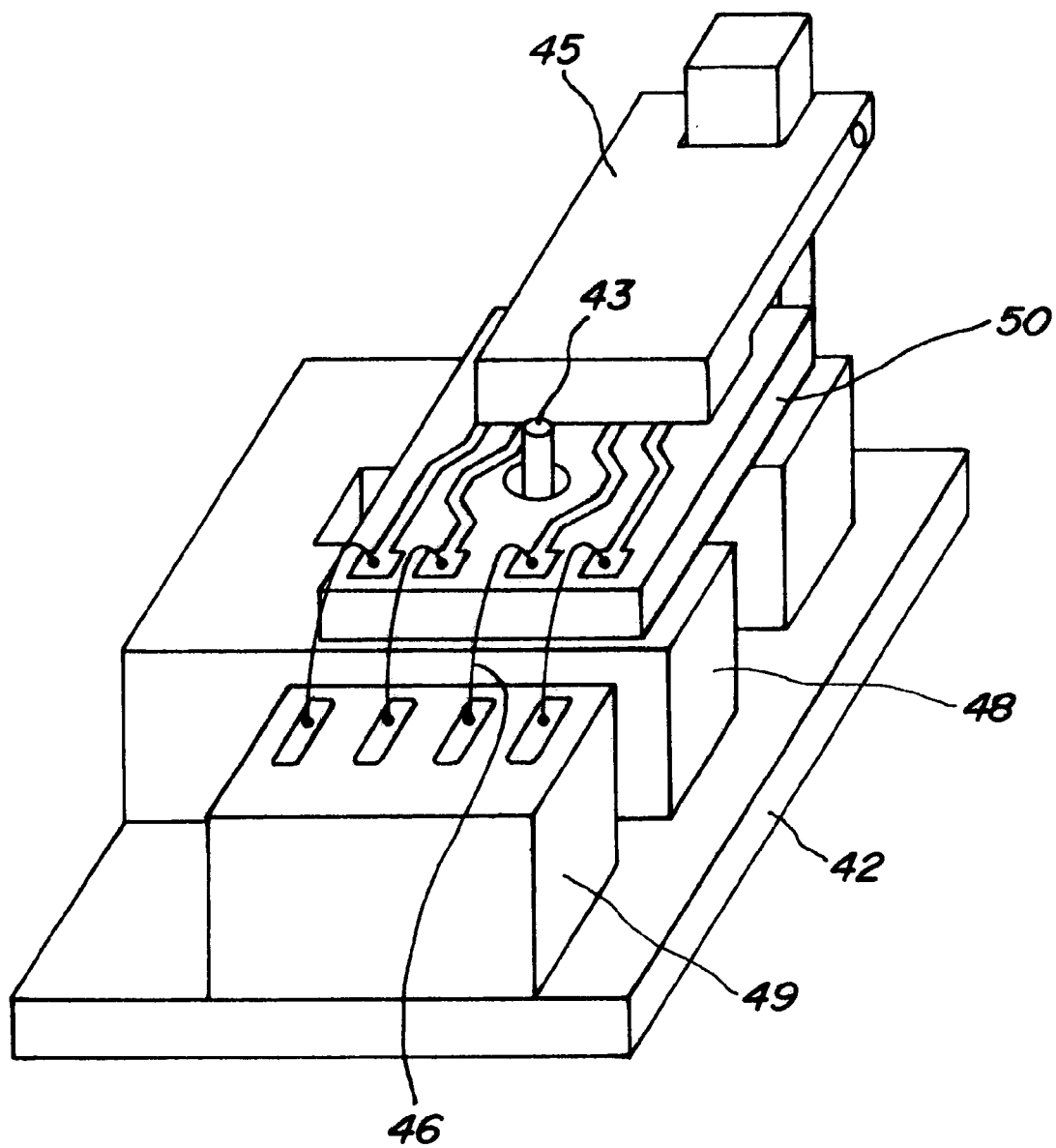
FIG_17

FIG_18a
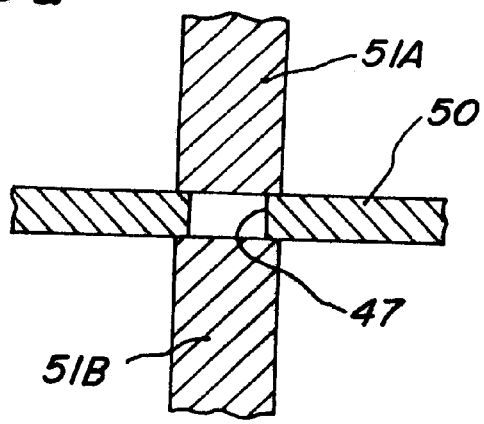
FIG_18b
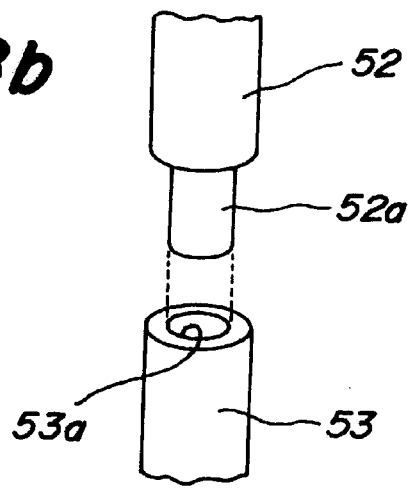
FIG_18c
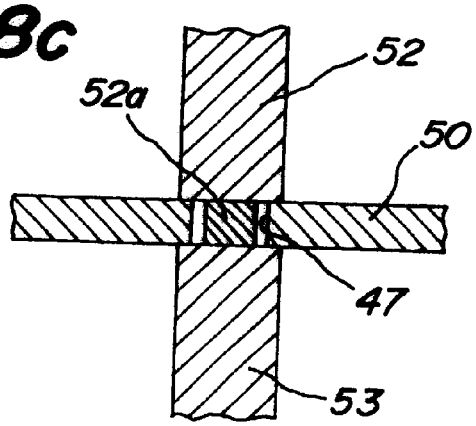

FIG_19a
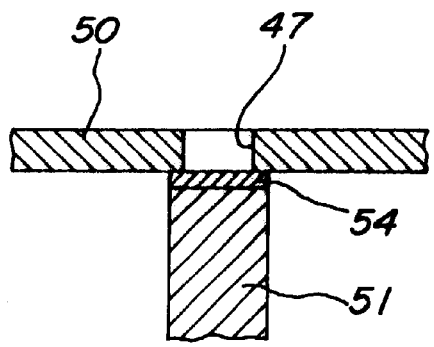
FIG_19b
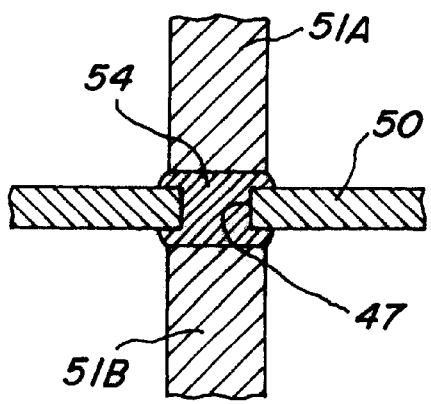
FIG_19c
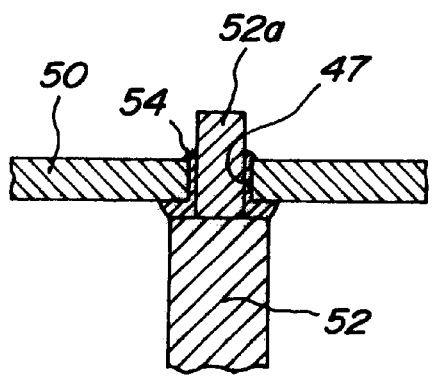
FIG_19d
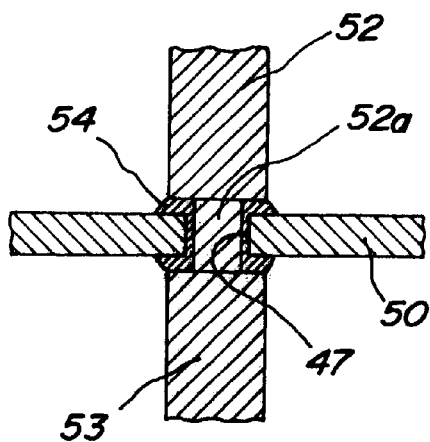

FIG_20a
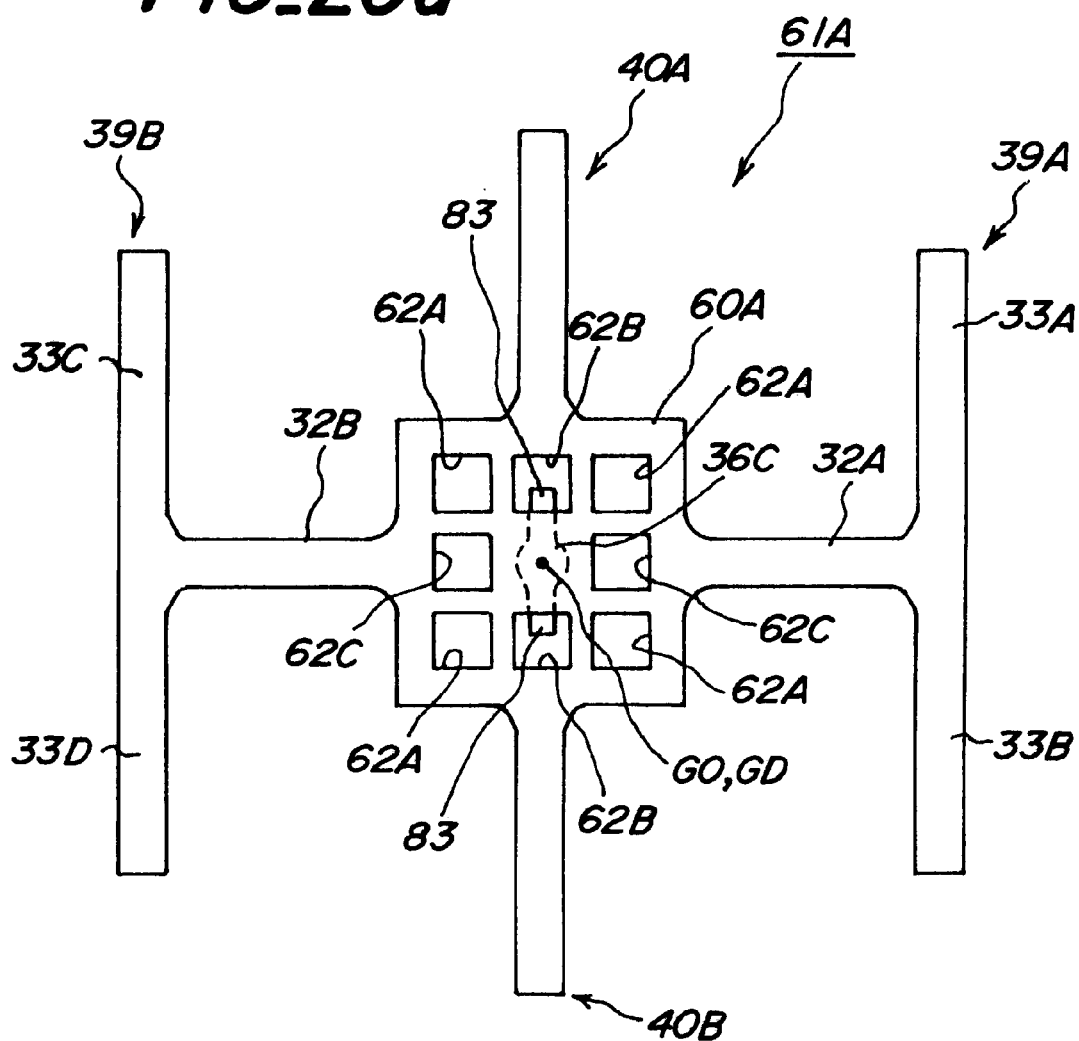
FIG_20b
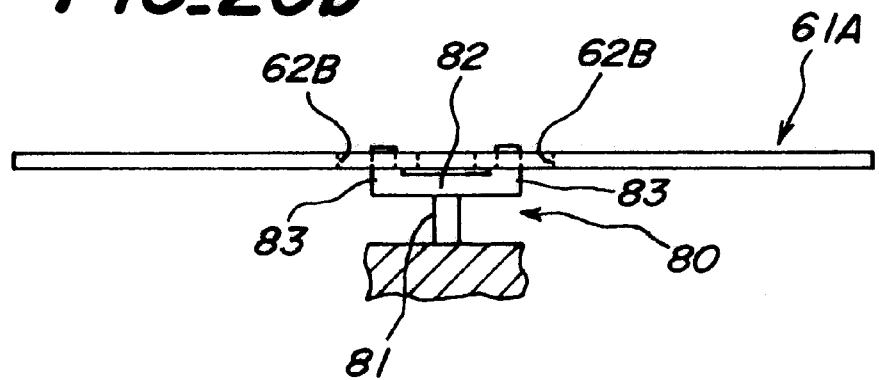

FIG.21
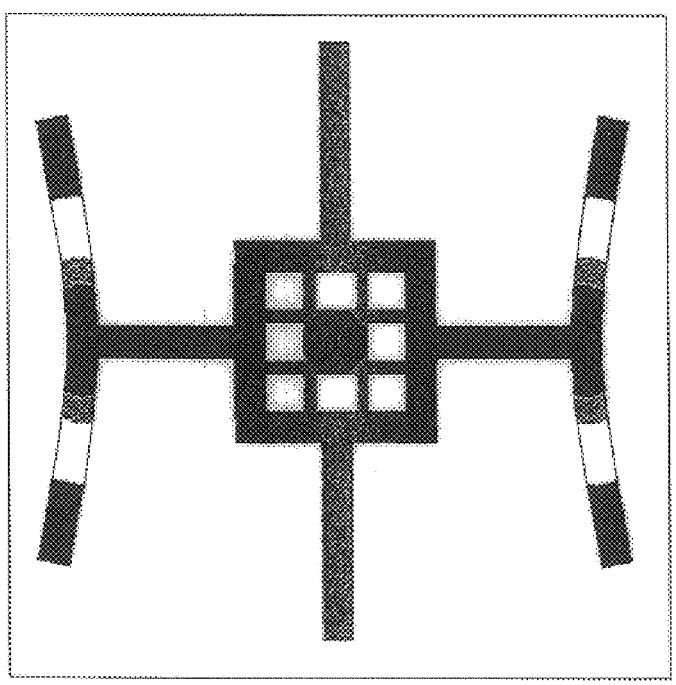
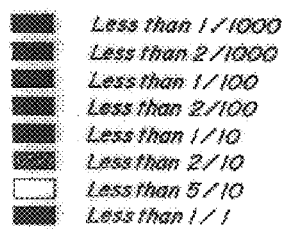

FIG_25

VIBRATORY GYROSCOPE, VIBRATOR USED IN THIS GYROSCOPE, METHOD FOR ANALYZING VIBRATION OF THE VIBRATOR, METHOD FOR SUPPORTING THE VIBRATOR, AND METHOD FOR MANUFACTURING THE VIBRATORY GYROSCOPE

CROSS REFERENCE TO RELATED APPLICATION

This is a continuation-in-part application of U.S. Ser. No. 09/166,089, filed Oct. 5, 1998 now U.S. Pat. No. 6,186,003 now allowed, the entirety of which is incorporated herein by reference.

BACKGROUND OF THE INVENTION

1. Technical Field

The present invention relates to a vibratory gyroscope and a vibrator capable of being preferably used in this vibratory gyroscope.

2. Related Arts

Japanese laid-open publication Tokkaihei No.7-83671 has disclosed a vibratory gyroscope using a tuning-fork vibrator made by joining a total of three vibration pieces composed of a middle driving vibration piece and two detecting vibration pieces before being at both sides of the middle driving vibration piece all joined to a base part in one body. FIG. 1 shows the composition of an example of such a vibratory gyroscope. In the example shown in FIG. 1, a tuning-fork vibrator 71 forming a vibratory gyroscope is composed of three vibration pieces which are composed of a middle driving vibration piece 73 and two detecting vibration pieces 72 and 74 arranged at both sides of it nearly in parallel with it, and a base part 75 with which the driving vibration piece 73 and the detecting vibration pieces 72 and 74 are joined in one body.

In the above-mentioned tuning-fork vibrator 71, the driving vibration piece 73 is vibrated in the X-Z plane by a driving means (not shown) provided on the driving vibration piece 73. And the left and right detecting vibration pieces 72 and 74 are resonated in the same X-Z plane. When a turning angular rate ω acts around the axis of symmetry Z of the tuning-fork vibrator 71, a Coriolis force (f) acts on each of the detecting vibration pieces 72 and 74. Since the detecting vibration pieces 72 and 74 are vibrating in the X-Z plane, vibration in the Y-Z plane is induced in the detecting vibration pieces 72 and 74. A turning angular rate is measured by detecting this vibration by means of an detecting means (not shown) provided on each of the detecting vibration pieces 72 and 74.

In a former vibratory gyroscope of the above mentioned composition, in case of forming the vibratory gyroscope by supporting the tuning-fork vibrator 71, the vibrator 71 is supported by fixing the entire end part 76 of the base part 75 of the tuning-fork vibrator 71 opposite to the other end part at which the driving vibration piece 73 and the detecting vibration pieces 72 and 74 exist, or by fixing an unillustrated supporting vibration piece at a position of this end part 76 corresponding to the axis of symmetry Z. Therefore, it cannot be said that a Coriolis force generated by a turning angular rate is efficiently utilized for action of a detecting vibration in the detecting vibration pieces 72 and 74, and there is a problem that the sharpness of resonance (Q value) of the detecting vibration in the Y-Z plane in the detecting vibration pieces 72 and 74 is low and the measurement sensitivity for a turning angular rate is low.

SUMMARY OF THE INVENTION

Recently, a vibratory gyroscope is used as a turning rate sensor in a vehicle control method of an automobile body turning rate feedback system. Such a system detects the direction of a steering wheel itself by a turning angle of the steering wheel. At the same time as this, the system detects a turning rate of the actually turning car body by means of a vibratory gyroscope. The system finds a difference between the direction of the steering wheel and the actual body turning rate by comparing them with each other, and attains a stable body control by compensating a wheel torque and a steering angle on the basis of this difference.

It is necessary to contain such a vibrator into a particular container package, which is then fixed on a fixing member such as a fixing plate. The fixing member is then fixed on a car body. In such a case, the vibrator is adhered onto the fixing plate to fix it thereon.

However, in a car body control system, a vibratory gyroscope and its vibrator is subjected to a wide range of environmental temperature, including high and low temperatures. Such temperature range is normally −40° C. to +80° C., and may be broader when more strict specification is applied. Particularly when applying a vibrator made of a piezoelectric single crystal, the temperature characteristics of the crystal also affects the performance of the gyroscope.

The inventors have tried to eliminate or reduce the temperature characteristics of the vibrator itself. However, when adhering such a vibrator onto a fixing plate and measuring a sharpness of resonance (Q value) of its driving vibration between −40° C. it +80° C., it was found that the Q value is substantially changed or deviated between −40° C. to +80° C. For example, if the Q value is substantially constant near room temperature, the Q value is largely changed when the environment temperature of the vibrator is changed towards −40° C. or +80° C.

An object of the present invention is to provide a vibratory gyroscope which can improve the sharpness of resonance (Q value) of a detecting vibration in a detecting vibration piece and can measure a turning angular rate with a sensitivity.

Another object of the invention is to provide an analyzing method for manufacturing a vibrator having a high sharpness of resonance of a detecting vibration in a detecting vibration piece, and a supporting method and a manufacturing method using this analyzing method.

Another object of the invention is, when adhering a vibrator onto a supporting member, to reduce the deviation of Q value of the driving vibration excited in the vibrator when the environmental temperature of a gyroscope is changed so that the temperature-dependent change of the performance of the gyroscope may be reduced.

A vibratory gyroscope of the present invention is a vibratory gyroscope for detecting a turning angular rate of rotation applied to a vibrator, which vibratory gyroscope a vibrator provided with a plurality of vibration pieces and a base part having the plurality of vibration pieces connected with it and is composed so as to obtain the turning angular rate on the basis of a detecting vibration excited in the vibrator according to the turning angular rate when giving a driving vibration to at least one of the vibration pieces, and supports the vibrator in a domain where the detecting vibration is smallest in the vibrator, said domain being in the vicinity of the center of gravity of the vibrator.

Preferably the vibrator is provided with a supporting hole in a domain where the detecting vibration is smallest in a state where the supporting hole is not provided in the vibrator and the vibrator is supported with or in the vicinity, preferably on or near the inner wall face of this supporting hole.

Supporting the vibrator in the vicinity of the supporting hole means supporting the surface of the vibrator within a range of 1 mm from the periphery of the supporting hole.

Another embodiment the present invention is a vibratory gyroscope for detecting a turning angular rate of rotation applied to a vibrator and the vibrator is provided with a plurality of vibration pieces and a base part having the plurality of vibrating pieces connected with it and the base part is provided with a supporting hole the gyroscope is composed so as to obtain the turning angular rate on the basis of a detecting vibration excited in the vibrator according to the turning angular rate when giving a driving vibration to at least one of the vibration pieces and the gyroscope is provided with a supporting means for supporting the vibrator with or in the vicinity of the supporting hole.

And the present invention is a vibrator formed out of a piezo-electric single crystal and comprises a plurality of vibration pieces each of which performs a bending-vibration and a base part having the plurality of vibration pieces connected with it and said base part is provided with a supporting hole for supporting said vibrator.

Another embodiment of the present invention is a vibratory gyroscope for detecting a turning angular rate of rotation applied to a vibrator, wherein the vibrator is provided with a plurality of vibration pieces and a base part having the plurality of vibration pieces connected with it and is composed so as to obtain the turning angular rate on the basis of a detecting vibration excited in the vibrator according to the turning angular rate when giving a driving vibration to at least one of the vibration pieces, and the vibrator is supported in a domain where the detecting vibration is smallest in the vibrator, said domain being in the vicinity of the center of gravity of the vibrator (when it is not vibrated). As a result it is possible to improve the sharpness of resonance (Q value) of a detecting vibration in a detecting vibration piece, raise the sensitivity, and reduce the influence which the strain of a vibrator, caused by vibration or acceleration given from the outside of the vibrator, exerts on its vibrating state.

Another aspect of the invention is to provide a vibratory gyroscope for detecting a turning angular rate of rotation applied to a vibrator in a predetermined temperature range, wherein the vibratory gyroscope comprises a vibrator, a supporting member for supporting said vibrator and an adhesive portion made of an adhesive provided between said supporting member and said vibrator for bonding said vibrator to said supporting member. The vibratory gyroscope detects a turning angular rate based on a detecting vibration excited in the vibrator according to said rotation when a driving vibration is excited in said vibrator. The adhesive has a tan δ not higher than 0.1 within said predetermined temperature range.

The inventors have searched for the reason why the Q value of the driving vibration excited in a vibrator is substantially deviated dependent on the temperature change. They finally found that it is possible to improve, and to reduce the deviation of, the Q value in the whole temperature range defined in a specification, by reducing tan δ of the adhesive to a value not higher than 0.1.

Tan δ of the adhesive may be preferably be not higher than 0.03 for improving, and reducing the deviation of, Q value in the whole temperature range specified in a specification (normally −40° C. to +80° C. and more preferably be −40° C. to +85° C.). The lower limit of tan δ may be 0.00.

The difference between the maximum and minimum values of tan δ of the adhesive in the temperature range may preferably be not higher than 0.03.

The specific gravity of the adhesive may preferably be not higher than 1.1 for further reducing the deviation of the Q value in the temperature range. It is preferable to improve the content of a filler in the adhesive to not more than 7 weight percent for reducing the specific gravity to a value not higher than 1.1 and towards 1.0.

The adhesive includes, but is not limited to, one or more adhesives selected from the group consisting of a synthetic rubber such as silicone rubber (such as silicone RTV rubber), silicone gel, silicone resin, ethylene-propylene rubber, butyl rubber and urethane rubber, a fluoride resin such as "Teflon" and ethylene tetrafluoride resin, vinyl chloride resin, "Nylon" and polyethylene.

The adhesive preferably has a dynamic modulus of elasticity of $10^2$ to $10^{10}$ Pa and a dynamic loss of $10^1$ to $10^8$ Pa. The thickness of the adhesive portion may be generally adjusted so as to be inversely proportional to the dynamic viscoelasticity.

The adhesive may preferably be a viscoelastic material with small deviation in its dynamic modulus of elasticity in a temperature range specified in a specification for a vibratory gyroscope. The maximum value of the dynamic modulus of elasticity within the temperature range may preferably be not more than 3 fold of its minimum value in the same temperature range.

The adhesive portion may be formed by any process. For example, liquid material before curing may be applied onto a desired region by means of coating, potting or spray coating to form the end coating layer. For example, silicone adhesives of various types, such as alcohol-liberating, acetone- liberating, oxime- liberating, acetic acid-liberating and addition reaction types, may be potted and adhered onto a desired region by means of a dispenser. When liquid type material is coated or potted on a desired region, such liquid type material may preferably have a viscosity of not more than 100 Pa·s to readily cover a larger area and to produce a coated film with a uniform thickness. A sheet or plate shaped material made of a polymer may be adhered onto a desired region to provide the adhesive portion.

The process for curing an adhesive includes, but is not limited to, curing processes caused by addition reaction of two types of solutions (two-part adhesive), addition reaction caused by heating, and alcohol liberating reaction.

The thickness of an adhesive portion between a supporting portion and vibrator may preferably be not lower than 0.05 mm and more preferably not lower than 0.1 mm for fixing the vibrator with improved reliability. The thickness of an adhesive portion between a supporting portion and vibrator may preferably be not higher than 1 mm and more preferably not higher than 0.4 mm for further reducing the deviation of the Q value within the temperature range and for improving the sensitivity of the detecting vibration.

And as a preferred embodiment, to support a vibrator at a domain where a detecting vibration is smallest and a domain where a driving vibration is smallest overlap each other can raise the Q value of the driving vibration as well as the detecting vibration and further improve the sensitivity.

In a particularly preferred embodiment the end driving vibration and a detecting vibration occur in the plane of a vibrator.

Since the amplitude of a driving vibration is considerably larger than the amplitude of a detecting vibration, it is important to reduce the influence of the driving vibration on the detecting vibration. In a preferred embodiment, a vibrator is supported at or in the vicinity of the center of gravity of the vibrator. Thanks to this, it is possible to minimize the influence of the driving vibration on the detecting vibration.

That a vibrator is supported at or in the vicinity of the center of gravity GO of the vibrator or the center of gravity GD of the driving vibration means that a vibrator supporting point may be located substantially at the center of gravity GO or GD and is within a circle of 1 mm in diameter, said circle having the center of gravity GO or GD as its center.

In a preferred embodiment, a supporting means is joined onto the surface of a vibrator in a domain where the detecting vibration is smallest by adhesion, gluing, soldering, metalizing or the like, or by pressure-joining.

And it is preferable to provide a supporting hole in a vibrator to support the vibrator on the inner wall face of this supporting hole. In this case, it is possible to provide a projection on a supporting means, insert this projection into the supporting hole, put an adhesive agent, a gluing agent, solder or a metalizing paste between the inner wall face of the supporting hole and the projection, and thereby join the vibrator and the projection with each other.

Depending on the shape and size of a vibrator, a domain where a detecting vibration is smallest in the vibrator sometimes does not appear on the surface of the vibrator or appears with a very small area. Accordingly, by providing a supporting hole in a vibrator and supporting the vibrator with this supporting hole, when exposing said domain to the inner wall face of the supporting hole, it is easy to more surely hold the domain where a detecting vibration is smallest.

A supporting hole may be what is called a blind hole but it is most preferably a through hole, and in case that it is a blind hole, the blind hole has preferably a depth of ½ or more in comparison with thickness of the vibrator. The reason is that a domain where a detecting vibration is smallest is wider inside the vibrator than on the surface of the vibrator.

In case of providing a supporting hole in a vibrator and supporting the vibrator with or in the vicinity of this supporting hole, in a preferred embodiment, at least part of the supporting hole exists within a domain where a detecting vibration is smallest in the vibrator in a state where said supporting hole is not provided in the vibrator. The reason that this is preferable is described. It has been found that in case that a domain where a detecting vibration is smallest is exposed onto the surface of the vibrator, when this domain is supported, the following problem occurs. That is to say, when a certain time elapses or the ambient temperature changes after a vibratory gyroscope has been assembled, the measurement of a turning angular rate sometimes was not stable.

The inventors have examined the reason and reached the following discovery. That is to say, for example, in a vibrator as described later, when assembling a vibratory gyroscope and then exciting a specified driving vibration in a vibrator and measuring distribution of the amplitude of vibration in each point of the vibrator, the vibration amplitude changes greatly around a node of the vibration. Due to this, it is difficult to coincide a node of the driving vibration and a node of the detecting vibration with each other. Furthermore, even if a domain where the detecting vibration is smallest is accurately supported at a point of time when a specific supporting means, for example, a projection for supporting has been joined with the domain where the detecting vibration is smallest on the surface of the vibrator, the domain where the detecting vibration is smallest may be sometimes moved slightly from its original position due to a change with the passage of time such as a temperature change and the like. Thus, the degree of disturbance caused by contact of a supporting means with the vibrator, said disturbance acting on a vibrating state of the vibrator, changes and the characteristics of the gyroscope changes.

On the other hand, it has been found that the magnitude of a detecting vibration is averaged in a fairly wide range, including a supporting hole and its peripheral area, by providing the supporting hole in a domain where the detecting vibration is smallest in a state where no supporting hole is provided in the vibrator and supporting the vibrator with this supporting hole. Thus, even if a certain time passes or an ambient temperature changes after the vibrator has been first supported with or in the vicinity of the supporting hole, the degree of disturbance exerted by the supporting means upon the detecting vibration has come to be hard to change, movement of the zero point caused by a temperature change has become small and the characteristics of the gyroscope have been greatly stabilized.

Additionally, a higher effect can be obtained by filling the supporting hole with such an adhesive as resin and holding the vibrator through the resin by means of the supporting means.

And in a preferred embodiment, a plurality of supporting holes are provided in a base part and a vibrator is supported by the plurality of supporting holes. By this, when an external vibration is applied to the vibrator, the influence of disturbance caused by this external vibration can be remarkably reduced. In this embodiment, it is preferable to support the vibrator with or in the vicinity of a plurality of supporting holes which are at positions being centrosymmetric with respect to the center of gravity of the vibrator. Thanks to this, the influence of disturbances caused by external vibrations is reduced further.

And it is possible to provide a plurality of supporting holes so as to surround a domain where a detecting vibration is smallest in a vibrator. In this case, it is particularly preferable to support the vibrator with a plurality of supporting holes which are at position being centrosymmetric with respect to the center of gravity of the vibrator.

And in a preferable vibrator, a plurality of vibration pieces comprise driving vibration pieces and detecting vibration pieces, and a supporting hole is provided between one of the detecting vibration pieces and a domain where a detecting vibration is smallest.

And in the above vibrator, it is particularly preferable that the domain where the detecting vibration is smallest in the vibrator extends to the inner wall face of the supporting hole. In this case, preferably, the supporting hole is provided around the domain where the detecting vibration is smallest, and more preferably, it is provided between the domain where the detecting vibration is smallest and a detecting vibration piece.

In a vibratory gyroscope of the present invention, as a material for a vibrator, it is preferable to use piezoceramic or a piezoelectric single crystal such as a single crystal of quartz, a single crystal of $LiTaO_3$, $LiNbO_3$ or the like, and particularly it is more preferable to use a piezoelectric single crystal such as a single crystal of quartz, $LiTaO_3$, or $LiNbO_3$. The reason is that a high Q value of a single crystal itself can be effectively utilized.

A domain where a detecting vibration or a driving vibration is smallest in the present invention indicates one or plural domains where the detecting vibration or driving vibration is smaller than that cannot be found. The vibration amplitude in a detecting vibration or driving vibration is preferably 2/1000 or less of the maximum vibration amplitude point in a vibrator and particularly preferably 1/1000 or less. Preferably, a domain where a detecting vibration is smallest and a domain where a driving vibration is smallest exist locally in part of the base part.

And the present invention computes the ratio of the amplitude of a detecting vibration in a vibrator to the maximum amplitude of the detecting vibration in the vibrator by means of a natural mode analysis by a finite element method and detects a domain where the detecting vibration is smallest from distribution of said ratios in each point of the vibrator. Particularly preferably, it computes the ratio of the amplitude of a driving vibration in each point to the maximum amplitude of the driving vibration in the vibrator by means of a natural mode analysis by a finite element method and detects a domain where the driving vibration is smallest from the distribution of the ratios in the vibrator.

BRIEF DESCRIPTION OF THE DRAWINGS

The file of this patent contains at least one drawing executed in color. Copies of this patent with color drawings will be provided by the Patent and Trademark Office upon request and payment of necessary fee.

FIG. 1 is a figure showing an example of a tuning-fork vibrator used in a conventional vibratory gyroscope.

FIGS. 3(a) and 3(b) are figures for explaining an example of a method for supporting a vibrator in the invention.

FIG. 4 is a color micrograph showing an example of a result of applying a natural mode analysis by a finite element method to a tuning-fork vibrator 1.

FIG. 5 is a color micrograph showing another example of a result of applying a natural mode analysis by a finite element method to a tuning-fork vibrator 1.

FIG. 15(a) is a front view showing a vibrator 31 supported by inserting a supporting projection into a supporting hole 47 at the middle of a base part 38 of the vibrator 31, and FIG. 15(b) is a sectional view of it.

FIG. 16 is a sectional view roughly showing an example of a supporting and fixing device of a vibrator.

FIG. 17 is a perspective view showing the supporting and fixing device of FIG. 16.

FIGS. 18(a) after 18(b) are sectional views of a main part showing a state of pressure-joining and supporting a vibrator by means of a pair of supporting projections.

FIGS. 19(a), 19(b), 19(c) and 19(d) are sectional views of a main part showing a state of joining a vibrator with a supporting means and supporting it, using a joining material 54.

FIG. 20(a) is a front view showing a vibrator 61A having eight holes provided in its base part 60A, and FIG. 20(b) is a sectional view of it.

FIG. 21 is a color micrograph showing an example of a result of applying a natural mode analysis by a finite element method to a driving vibration mode of the vibrator of FIG. 20.

DETAILED DESCRIPTION OF THE INVENTION

Figures 2A, 2B, 2C:
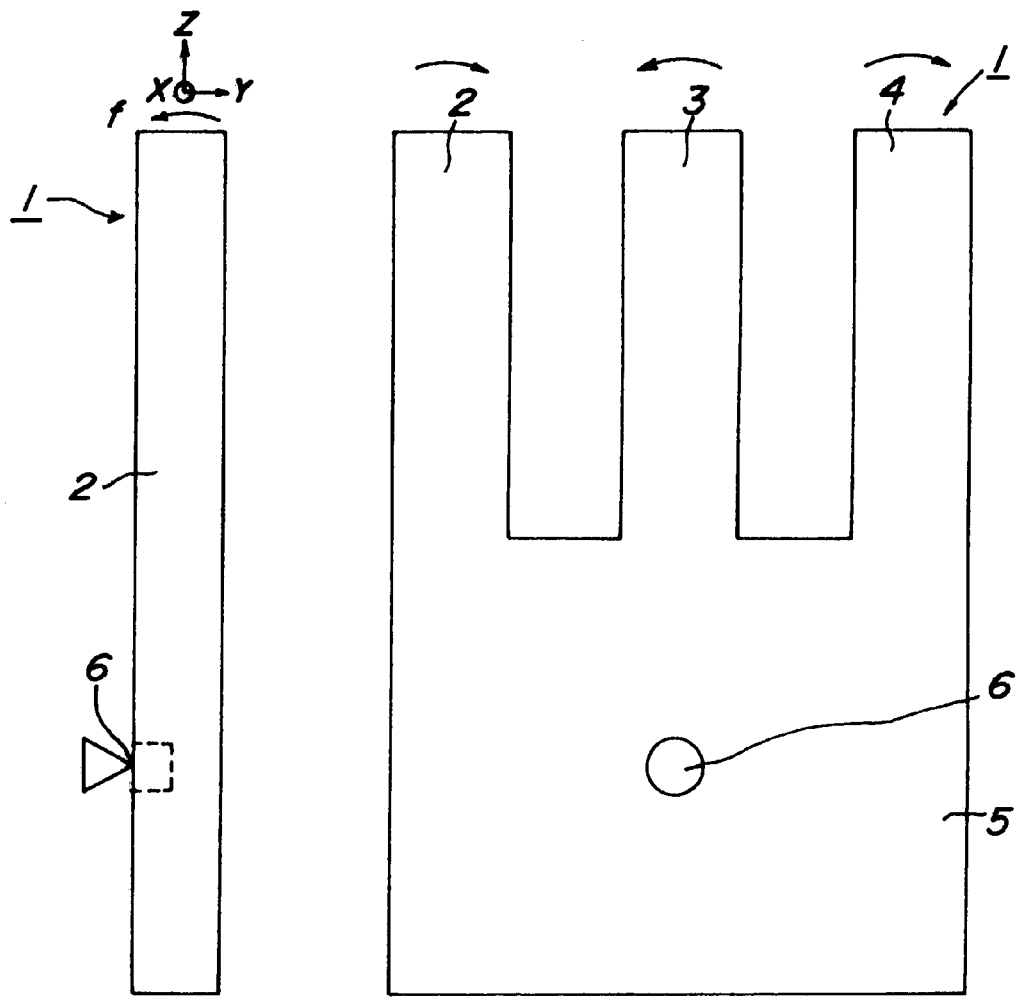
FIGS. 2(a), 2(b) and 2(c) are figures showing an example of a vibrator of a vibratory gyroscope of the present invention.

The present invention is further described in detail with reference to the drawings in the following. FIG. 2 shows an example of a vibrator of a vibratory gyroscope; 2(a) is a side view, 2(b) is a front view, and 2(c) is a plan view. This example shows a vibratory gyroscope of a vertical-arrangement type in which a driving vibration and a detecting vibration are vertical with each other. In an example shown in FIGS. 2(a) to 2(c), a tuning-fork vibrator 1 forming the vibratory gyroscope is composed of three vibration pieces 2 to 4 arranged nearly in parallel with one another, and a base part 5 joining these three vibration pieces. Among the three vibration pieces, the vibration pieces 2 and 4 at both sides form detecting vibration pieces, and the middle vibration piece 3 forms a driving vibration piece.

The driving vibration piece 3 is vibrated in the X-Z plane by means of an unillustrated driving means provided on the driving vibration piece 3. And the left and right detecting vibration pieces 2 and 4 are resonated in the same X-Z plane. When the vibrator is turned around the axis of symmetry Z of the tuning-fork vibrator 1 at a turning angular rate ($\omega$), a Coriolis force (f) acts on each of the detecting vibration pieces 2 and 4. Since the detecting vibration pieces 2 and 4 are vibrating in the X-Z plane, vibration in the Y-Z plane is excited in the detecting vibration pieces 2 and 4. A turning angular rate is measured by detecting this vibration by means of a detecting means (not shown) provided on each of the detecting vibration pieces 2 and 4.

This embodiment detects a small domain where a detecting vibration is smallest exists locally, by means of an analyzing method described later, provides a supporting hole in this domain, and supports the vibrator with this supporting hole.

A concrete supporting method for supporting a supporting hole is not limited in particular. As an example for it, as shown in FIGS. 3(a) and 3(b), a specified hole 7 is provided at a nearly middle domain 6 of a base part 5 in the direction of thickness of the base part 5, and the vibrator can be fixed by inserting a projection 10 into the supporting hole 7. The projection projects from a vibration piece 9 perpendicularly to the longitudinal direction of the vibration piece 9, projecting from a supporting means 8 of the vibratory gyroscope.

Fixing the projection 10 and the supporting hole 7 onto each other can be performed by applying metalization to the surface of the projection 10 and/or the inner wall face of the supporting hole 7 and then soldering or brazing, or by providing resin between the projection 10 and the hole 7. Although the base part 5 is supported on one surface of it in the example shown in FIGS. 3(a) and 3(b), the base part 5 can be also supported on both surfaces of it. And it is also possible to make the supporting hole 7 into a through hole instead of a blind hole, insert the projection 10 into and through the through hole, and fix both end parts of the projection 10 onto the supporting means 8 of the vibratory gyroscope.

In the above-mentioned example, it has been analyzed by an analyzing method of the present invention that a small domain where a detecting vibration is smallest and locally exists is a nearly middle domain 6 of the main face of the base part 5. This method is described.

The inventors first applied a natural mode analysis by a finite element method to a vibrator 1 having the above-mentioned shape in order to examine whether or not there is a small domain where a detecting vibration is smallest and localized in relation to a vibrator 1 having the above-mentioned shape. And the vibration amplitude at each domain of the tuning-fork vibrator in the X-Z plane (where a driving vibration is generated) or in the Y-Z plane (where a detecting vibration is generated by a Coriolis force), in case of assuming that the vibrator has been cut along the X-Z plane shown in FIG. 2, has been obtained as distribution of the ratio of the vibration amplitude at each domain to the vibration amplitude at the maximum vibration amplitude point. FIG. 4 shows a result in the X-Z plane where a driving vibration is generated, and FIG. 5 shows a result in the Y-Z plane where a detecting vibration is generated by a Coriolis force.

In the example shown in FIGS. 4 and 5, the respective Ad domains different in color from one another show domains each of whose colors represents the ratio of the vibration amplitude at a domain to the vibration amplitude at the maximum vibration amplitude point. A small domain having the smallest vibration, whose amplitude is less than one thousandth of the amplitude at the maximum vibration amplitude point in a vibrator, is indicated by orange color. And in this example, FIG. 4 shows the ratios in comparison with the maximum vibration amplitude point in a driving vibration, and FIG. 5 shows the ratios in comparison with the maximum vibration amplitude point in the detecting vibration; and from the result of FIG. 5, it has been confirmed that there is a small domain having the smallest detecting vibration. And similarly to the example shown in FIG. 2, it has been found that supporting the vibrator on the obverse and reverse sides at the nearly middle domain 6 of the main face of the base part 5 results in not only supporting the vibrator at a small domain having the smallest detecting vibration as known from FIG. 5 but also supporting the vibrator at a small domain having the smallest driving vibration as known from FIG. 3; and therefore in this example, supporting the vibrator in this way results in supporting the tuning-fork vibrator 1 in the overlapped domain having the smallest detecting vibration and having the smallest driving vibration.

Taking the above-mentioned results into account, a result shown in Table 1 has been able to be obtained by measuring the Q value of a driving vibration in the X-Z plane, the Q value of a detecting vibration in the Y-Z plane, and the sensitivity in relation to the example explained as a former example in FIG. 2 where the bottom part is fixed, the example where one axis is fixed, and the example where the vibrator is fixed as shown in FIG. 2 as the invention. From the result shown in Table 1, it has been found that both of the Q value of a driving vibration in the X-Z plane and the Q value of a detecting vibration in the Y-Z plane are higher and the sensitivity also is higher in the examples of the invention in comparison with the former examples.

TABLE 1

|  | Q of driving vibration | Q of detecting vibration | Sensitivity (at 1 degree/sec) |
| --- | --- | --- | --- |
| Bottom part fixed | 4000 | 3000 | 1.1 mV |
| One axis fixed | 7000 | 8000 | 3.4 mV |
| FIG. 2 | 30000 | 30000 | 10.8 mV |

Although the above-mentioned example shows an example of using three vibration pieces 2 to 4 in a tuning-fork vibrator 1, it is a matter of course that the number of vibration pieces is not limited to three and the invention can be also applied to another number of vibration pieces such as four pieces, five pieces, or the like. Although the above-mentioned example shows an example of generating a driving vibration in the X-Z plane and a detecting vibration in the Y-Z plane in FIG. 2, it is a matter of course that the invention can be also applied to a structure in which the shape of a vibrator 1 is kept as it is and a relation between both vibrations is reverse, namely, a driving vibration is generated in the Y-Z plane and a detecting vibration is generated in the X-Z plane.

And the present invention can be preferably applied to a vibrator of a horizontal-arrangement type in the following shape. A vibrator of this type uses a fixing piece part whose both ends are fixed, the main arm is provided at one side of this fixing piece part, a resonant piece is provided at the other side, and the fixing piece part, the main arm and the resonant piece are formed so as to extend substantially in a specified plane. That is to say, an exciting means and a bending-vibration detecting means can be provided at opposing sides of a fixing piece part, whose both ends are fixed. Thus, since a bad influence caused by an electromechanical mixture or the like between the exciting means and the bending-vibration detecting means can be prevented, the detection accuracy is more improved.

Figure 6:
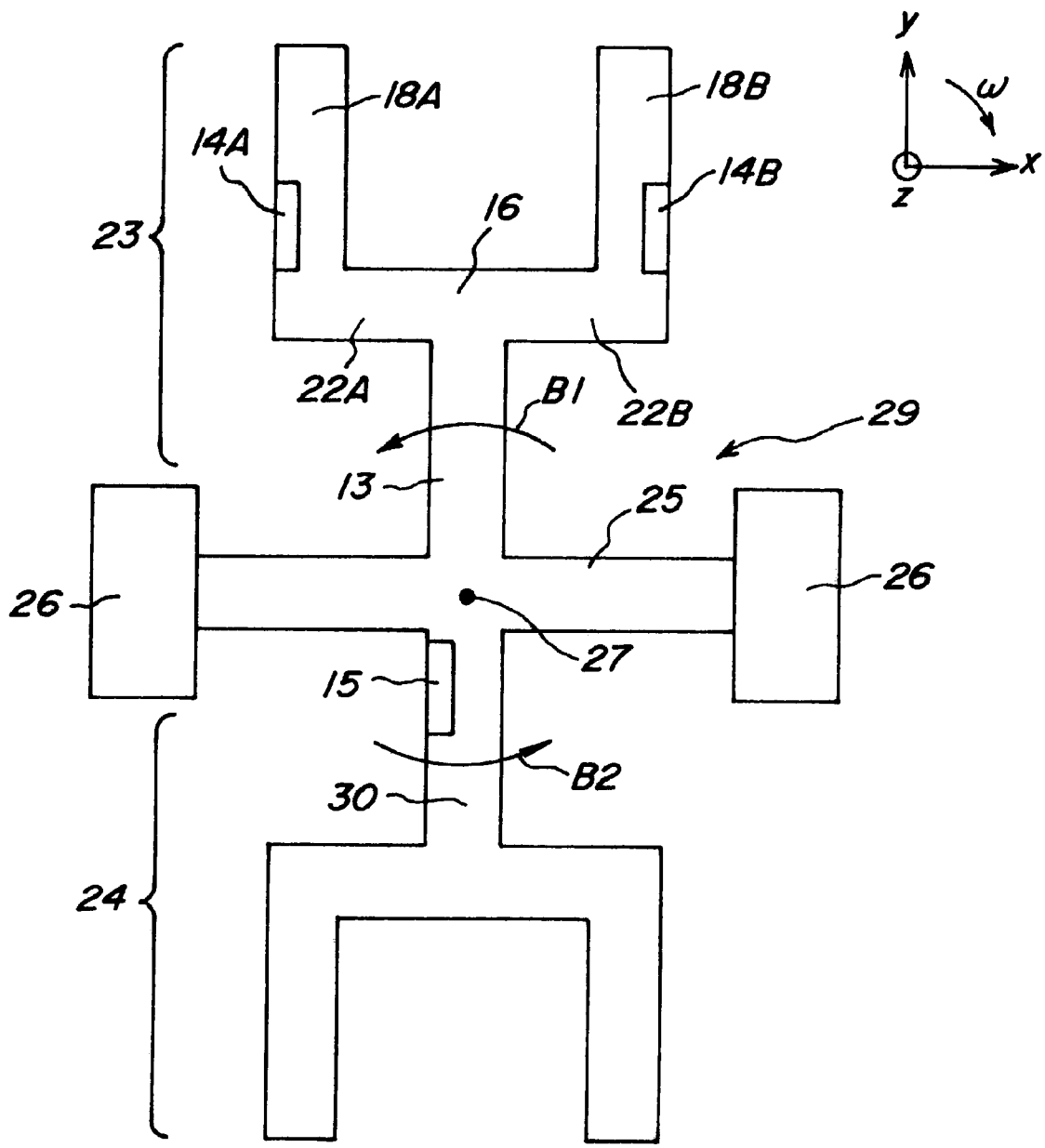
FIG. 6 is a rough front view for explaining operation of a vibrator 29 having opposite Y-shaped arms.

In FIG. 6, an exciting means and a detecting means are separated from each other by a fixing piece part 25.

Concretely, both ends of the fixing piece part 25 are fixed by fixing members 26. A main arm 23 is provided at one side of the fixing piece part 25. The main arm 23 is provided with a long and narrow base part 13, and the bending-vibration pieces 22A, 18A and 22B, 18B extending from an end part of the base part 13 perpendicularly to the longitudinal direction of the base part 13.

A resonant piece 24 is provided at the other side of the fixing piece part 25. The resonant piece 24 is provided with a rectangle-shaped supporting part 30 extending from and perpendicularly to the fixing piece part 25, and an exciting means 15 is provided in the supporting part 30. The main arm 23 and the resonant piece 24 are linearly symmetric with respect to the fixing part 25. 14A and 14B represent detecting means.

Figure 7:
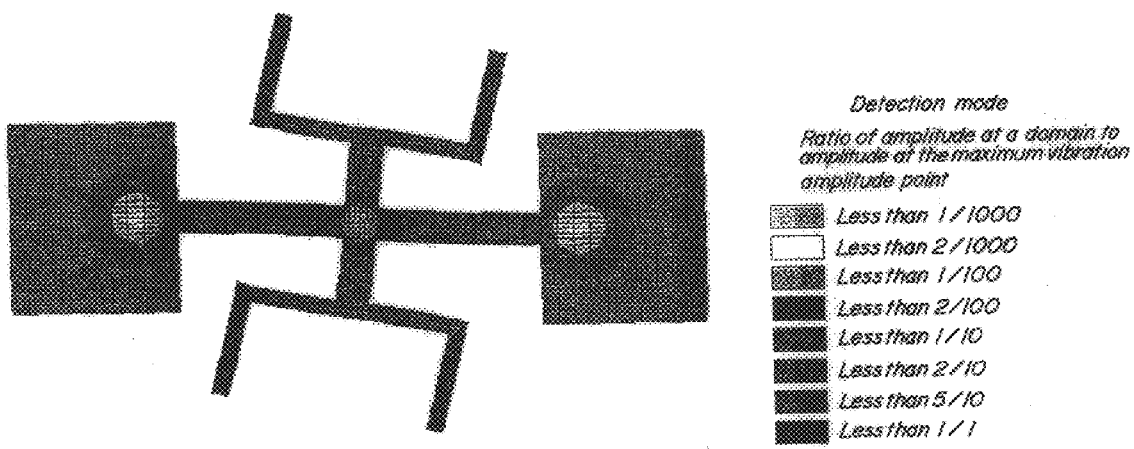
FIG. 7 is a color micrograph showing an example of a result of applying a natural mode analysis by a finite element method to a detecting vibration mode of a vibrator of FIG. 6.
Figure 8:
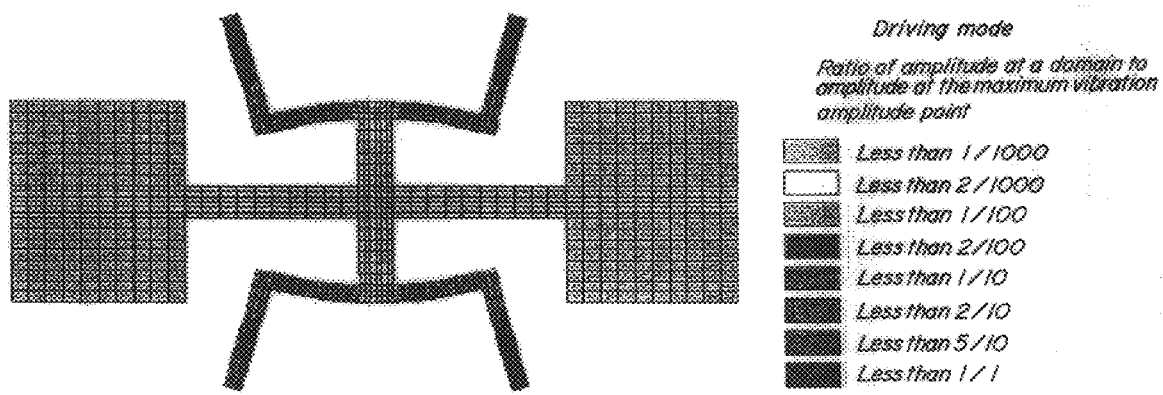
FIG. 8 is a color micrograph showing another example of a result of applying a natural mode analysis by a finite element method to a driving vibration mode of a vibrator of FIG. 6.

FIGS. 7 and 8 show the result of applying a natural mode analysis by a finite element method to a vibrator having the opposing Y-shaped arms joined with the joint of two base parts as shown in FIG. 6. An example shown in FIG. 7 is a result in relation to a detection mode vibration, and an example shown in FIG. 8 is a result in relation to a driving mode vibration. From the example shown in FIG. 7, it has been confirmed that there is a small domain having the smallest detecting vibration at the respective middle points of both base parts and an intersecting point of the opposing Y-shaped arms and the joint of the two base parts. And from the example shown in FIG. 8, it has been confirmed that there is a small domain having the smallest driving vibration also in a driving mode vibration. In the example shown in FIG. 7, it has been found that supporting the vibrator at the respective middle points of both base parts and an intersecting point of the opposing Y-shaped arms and the joint of the two base parts results in also supporting the vibrator at the small domain having the smallest driving mode vibration as known from FIG. 8; and therefore in this example, the vibrator is supported in the overlapped domain having the smallest detecting vibration and the smallest driving vibration.

Actually in relation to the vibrators of FIGS. 7 and 8, when the Q value of a driving vibration, the Q value of a detecting vibration in the same plane as the driving vibration, and the sensitivity have been measured in relation to the example explained in FIG. 1 where the bottom part is fixed and the example where the vibrator is supported at each of the small domains having the smallest detecting vibration according to the invention, namely, at the respective middle points of both base parts or an intersecting point of the opposing Y-shaped arms and the joint of the two base parts; the results shown in Tables 2 and 3 have been able to be obtained. Hereupon, the result of Table 2 shows an example of supporting the vibrator at the intersecting point of the opposing Y-shaped arms and the joint of the two base parts, and the result of Table 3 shows an example of supporting the vibrator at the respective two middle points of both base parts . From the results shown in Tables 2 and 3, it has been found that the Q value of a driving vibration is made slightly higher and the Q value of a detecting vibratio n is made extraordinarily higher, and furthermore the sensitivity is made higher in any of the examples of the invention, in comparison with the former examples.

TABLE 2

|  | Q of driving mode vibration | Q of detecting mode vibration | Sensitivity (at 1 degree/sec) |
| --- | --- | --- | --- |
| Bottom part fixed | 4000 | 300 | 0.2 mV |
| Node fixed (invention) | 5000 | 3000 | 1.3 mV |

TABLE 3

|  | Q of driving mode vibration | Q of detecting mode vibration | Sensitivity (at 1 degree/sec) |
| --- | --- | --- | --- |
| Bottom part fixed | 4000 | 300 | 0.2 mV |
| Node fixed (invention) | 5000 | 4000 | 1.5mV |

And when comparing Table 1 showing the result of a vibratory gyroscope of a vertical-arrangement type and Tables 2 and 3 each of which shows the result of a vibratory gyroscope of a horizontal-arrangement type with each other among the examples of the invention, it has been found that in any example of the invention the Q value of a detection mode vibration is made one digit or so higher and the invention is more effective to a vibratory gyroscope of a horizontal-arrangement type having usually a small Q value of the detection mode vibration.

And the present invention can be preferably applied to a vibratory gyroscope of a horizontal-arrangement type as described below. This vibrator is a vibrator for turning around a specified turning axis and is provided with at least a plurality of vibration systems, and is formed so that these vibration systems extend in a specified plane intersecting the turning axis and the vibration system is provided with a first vibration system containing a radial vibration component in which the center of gravity of vibration of the vibration system vibrates in the radial direction in a specified plane with respect to the center of gravity of the vibrator, and a second vibration system containing a circumferential vibration component in which the center of gravity of vibration of the vibration system vibrates in the circumferential direction in a specified plane with respect to the center of gravity of the vibrator.

A vibration component vibrating in the circumferential direction means a vibration component vibrating in the circumferential direction in a specified plane with respect to the center of gravity GO. A vibration component vibrating in the radial direction means a vibration component vibrating in the diametrical direction in a specified plane with respect to the center of gravity GO, namely, a component vibrating alternately in the directions of becoming more distant from and closer to the center of gravity GO.

The first and second vibration systems are connected with each other in some manner to form a vibrator extending in a specified plane. A turning angular rate can be detected by turning such a vibrator around the axis of turning Z as shown by an arrow w.

Figure 9:
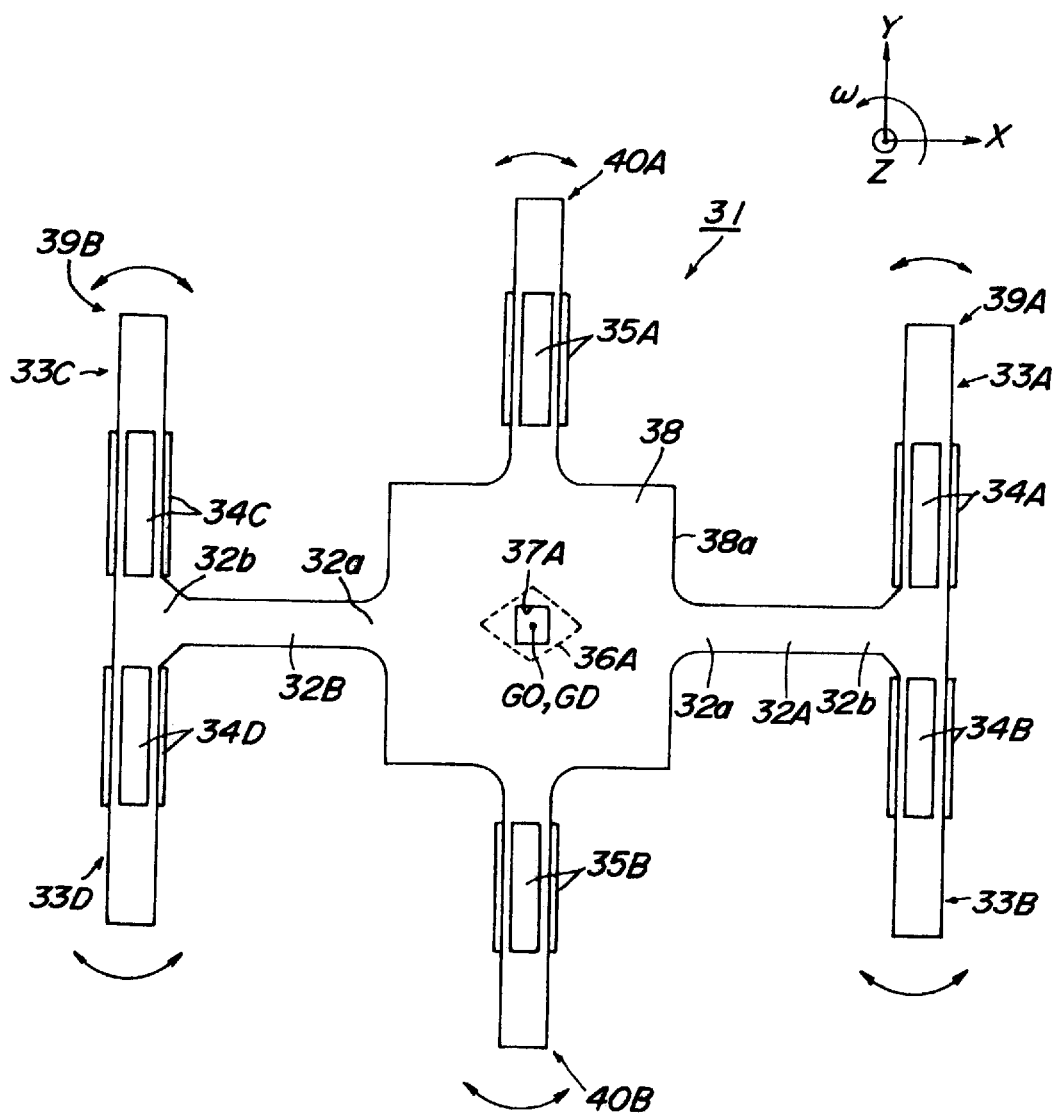
FIG. 9 is a rough front view for explaining operation of a vibrator 31 to which the present invention can be particularly preferably applied.

FIG. 9 is a plan view roughly showing a vibratory gyroscope provided with a vibrator 31 made of a piezoelectric single crystal according to this embodiment. A base part 38 is in the shape of a tetrad-symmetric square with the center of gravity GO of the vibrator as the center. Two driving vibration systems 39A, 39B (first vibration system in this example) and two detecting vibration systems 40A, 40B (the second vibration system in this example) project from the peripheral part 38a of the base part 38 radially in four directions, and the respective vibration systems are separated from one another. The driving vibration systems 39A and 39B are diad-symmetric with the center of gravity GO as the center, and the detecting vibration systems 40A and 40B are diad-symmetric with the center of gravity GO as the center.

The driving vibration systems 39A and 39B are provided with supporting parts 32A and 32B projecting from the peripheral part 38a of the base part 38 and bending-vibration pieces 33A, 33B, 33C and 33D extending from the top ends 32b of the supporting parts 32A and 32B perpendicularly to the supporting parts. The bending-vibration pieces 33A, 33B, 33C and 33D are respectively provided with driving electrodes 34A, 34B, 34C and 34D. The detecting vibration systems 40A and 40B are formed out of long and narrow circumferential bending-vibration pieces, and these bending-vibration pieces are respectively provided with detection electrodes 35A and 35B.

The inventors applied a natural mode analysis by a finite element method to the vibrator of FIG. 9 in order to examine an influence which the driving vibration mode and the detecting vibration mode have on the whole vibrator. And we made the vibrator of quartz and obtained the amplitude of vibration of each point of the vibrator as a distribution of the ratio of the amplitude of vibration of each point to the maximum vibration amplitude point.

Figure 10:
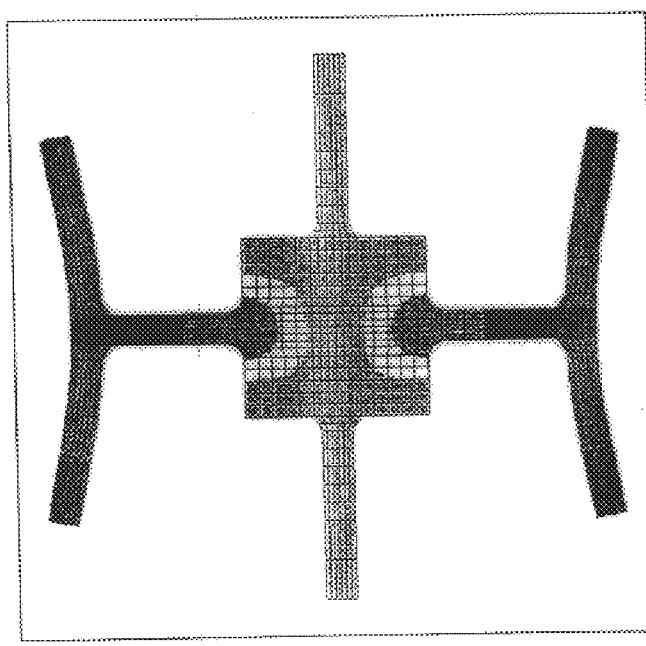
FIG. 10 is a color micrograph showing an example of a result of applying a natural mode analysis by a finite element method to a driving vibration mode of a vibrator of FIG. 9.
Figure 11:
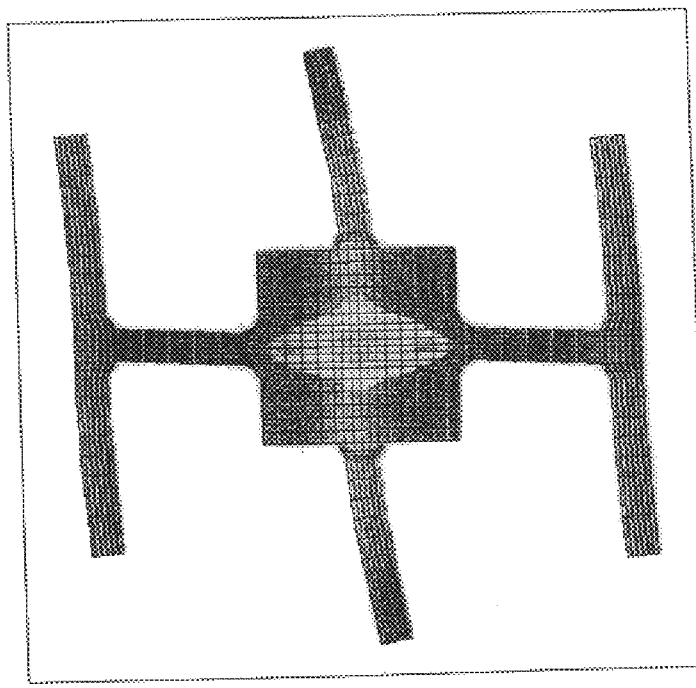
FIG. 11 is a color micrograph showing an example of a result of applying a natural mode analysis by a finite element method to a detecting vibration mode of the vibrator of FIG. 9.

FIG. 10 shows a relative ratio of the amplitude of vibration of each point in the vibrator to the maximum vibration amplitude in a driving vibration mode, and FIG. 11 shows a relative ratio of the amplitude of vibration of each point in the vibrator to the maximum vibration amplitude in a detecting vibration mode. In a driving vibration mode of FIG. 10, the respective bending-vibration pieces bend-vibrate around the vicinities of the top ends 32b of the supporting parts 32A and 32B. In a detection mode of FIG. 11, the supporting parts 32A and 32B bend-vibrate circumferentially around the fixing parts 32a, and the bending-vibration pieces 40A and 40B of the detecting vibration system bend-vibrate correspondingly to this.

In FIGS. 10 and 11, the respective domains different in color from one another show domains each of whose colors represents the ratio of the vibration amplitude at a domain to the vibration amplitude at the maximum vibration amplitude point. Orange indicates a domain being smallest in amplitude.

According to FIG. 10, a tensile stress is applied in the vicinity of the fixing part 32a of each of the supporting parts 32A and 32B to the base part 38 with vibration of each driving vibration system, and transformation is seen. But since the driving vibration systems 39A and 39B are arranged at diad-symmetric positions, influences of this transformation cancel each other in the base part. Therefore, no influence by the driving vibration is seen near the center of the base part and in the detecting vibration systems 40A and 40B located between the driving vibration systems.

According to FIG. 11, influences exerted by the driving vibration systems 39A and 39B on the base part cancel each other. Furthermore, since the detecting vibration systems are located at diad-symmetric positions, influences exerted by the detecting vibration systems 40A and 40B on the base part cancel each other, also. As the result, no influence by the detecting vibration is seen in the vicinity of the center 36A of the base part (see FIGS. 9 and 11).

According to the present invention, the vibrator 31 is supported and fixed within a domain 36A where the detecting vibration is smallest in amplitude. Or a supporting hole 37A is formed there.

And in this example, as shown in FIGS. 9 to 11, the center of gravity GO of the vibrator is located within a domain where the driving vibration is smallest.

And in this example, the center of gravity GO of the vibrator is located within a domain where the detecting vibration is smallest, and the supporting hole 37A is provided in the overlapped domain and the vibrator is supported as described later using the supporting hole 37A.

Figure 12:
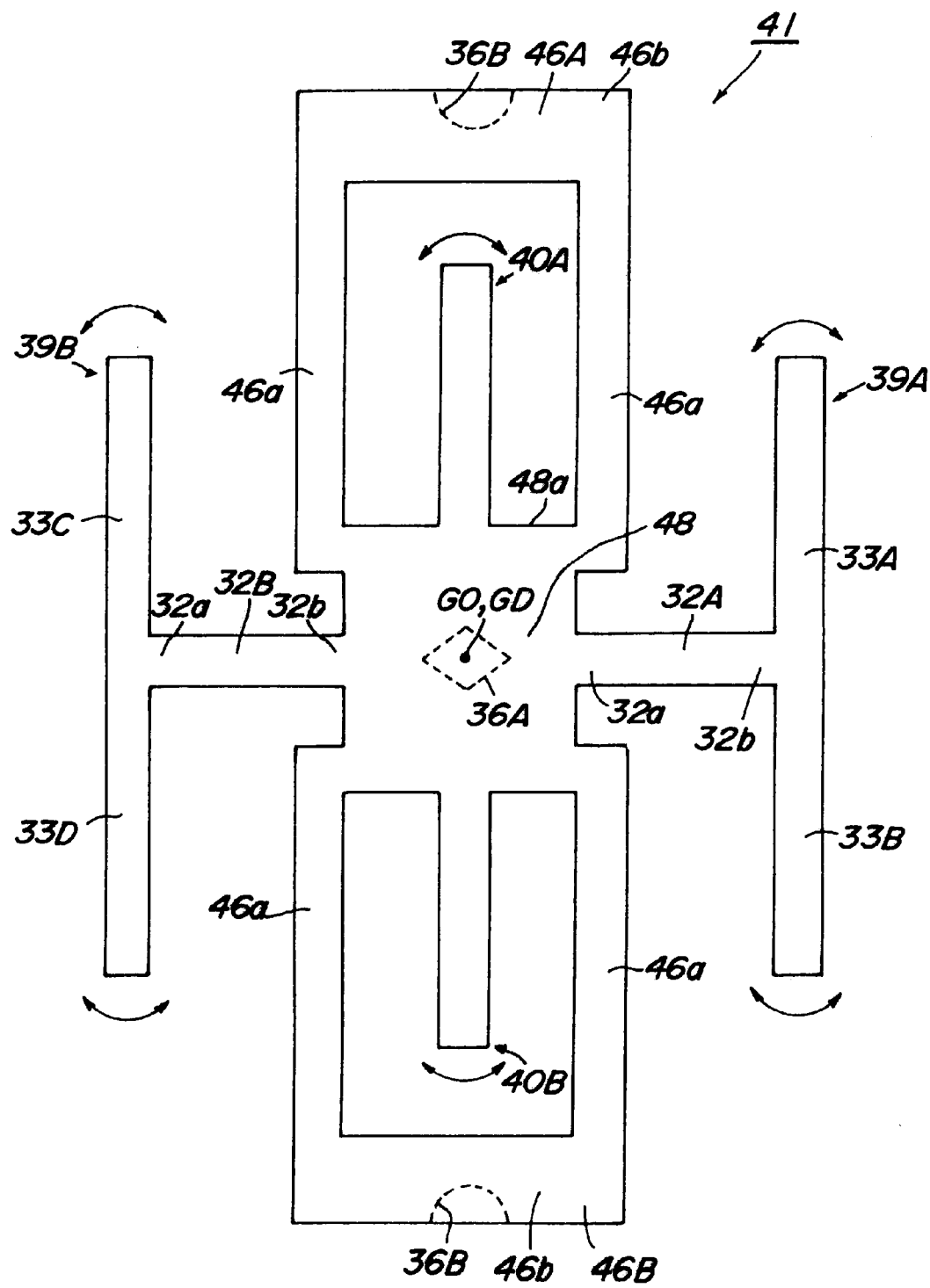
FIG. 12 is a rough front view for explaining operation of another vibrator 41 to which the present invention can be applied.

FIG. 12 is a plan view roughly showing a vibrator 41 according to another embodiment. Driving vibration systems 39A, 39B and detecting vibration systems 40A, 40B and operation of them are similar to those shown in FIG. 9. Frame parts 46A and 46B extend from two peripheral parts 48a at the detecting vibration system sides of the base part 48, and each detecting vibration system is surrounded by each frame part. Each frame part is provided with connecting parts 46a extending in parallel with each detecting vibration system and a supporting frame 46b for supporting and fixing the vibrator according to need. A domain having the smallest amplitude in a driving vibration and a detecting vibration in each of the frame parts 46A and 46B is supported and fixed.

Figure 13:
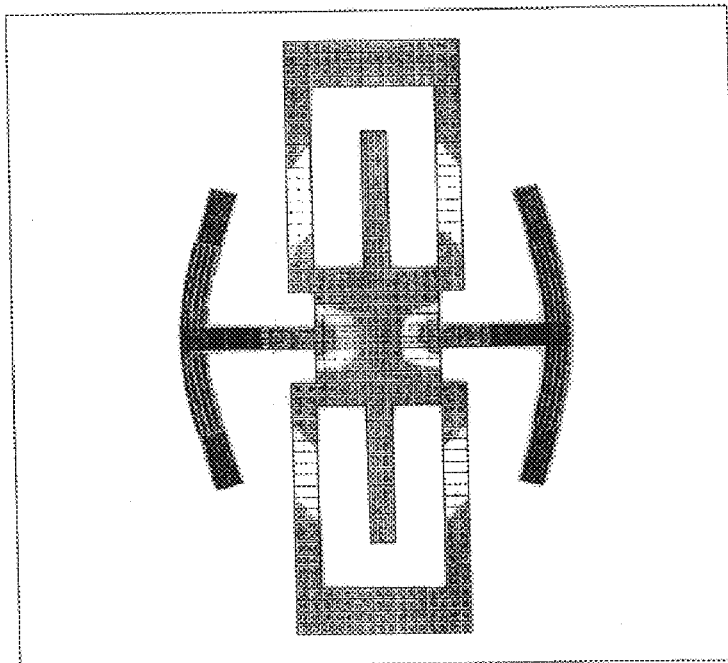
FIG. 13 is a color micrograph showing an example of a result of applying a natural mode analysis by a finite element method to a driving vibration mode of the vibrator of the type of FIG. 12.
Figure 14:
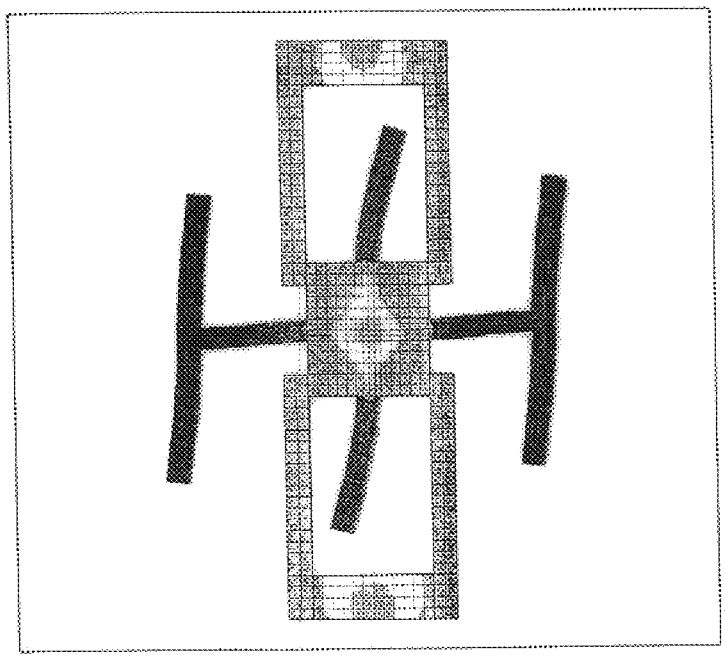
FIG. 14 is a color micrograph showing an example of a result of applying a natural mode analysis by a finite element method to a detecting vibration mode of the vibrator of FIG. 12.

FIG. 13 shows a relative ratio of the amplitude of vibration of each point in the vibrator of FIG. 12 to the maximum vibration amplitude in a driving vibration mode, and FIG. 14 shows a relative ratio of the amplitude of vibration of each point in the vibrator to the maximum vibration amplitude in a detecting vibration mode.

According to FIG. 13, a tensile stress is applied in the vicinity of the fixing part 32a of each of the supporting parts 32A and 32B to the base part 48 with vibration of each driving vibration system, and transformation is seen. This influence is slightly seen in the connecting part 46a of the frame part. Since these influences cancel each other, however, no influence by the driving vibration is seen near the center of the base part and in each bending-vibration piece of the driving vibration systems and in each supporting frame 46b of the frame parts.

According to FIG. 14, influences exerted by the driving vibration systems and the detecting vibration systems on the base part 48 cancel each other, and as the result, no influence by the detecting vibration is seen in the vicinity 36A of the center of the base part 48. A supporting hole can be provided in 36A. In addition to this, however, since a domain 36B in the supporting frame 46b is also smallest in amplitude, this domain 36B also can be supported and fixed.

In this example, as shown in FIGS. 12 and 13, the center of gravity GO of the vibrator and the center of gravity GD of the whole driving vibration system are located within a domain having the smallest amplitude in a driving vibration. And as shown in FIGS. 12 and 14, the center of gravity GO of the vibrator and the center of gravity GD of the whole driving vibration system are located within a domain 36A having the smallest amplitude in a detecting vibration.

Next, a concrete supporting method is exemplified in case of providing a supporting hole in a vibrator. For example, as shown in FIGS. 15(a) and 15(b), in said vibrator 31, a supporting hole 47 is provided in a domain where the detecting vibration is smallest and the vibrator is supported with the supporting hole 47. A jig 43, which is a supporting means, is fixed on a supporting stand 42. The jig 43 is provided with a body 43a, a shoulder 43b and a projection 43c. The projection 43 is inserted into the supporting hole 47 to put the base part 38 on the shoulder 43b.

Results of experiment in case of using the vibrators 31 as shown in FIGS. 9 to 15 and adopting two kinds of supporting methods are described in the following.

First, a vibrator 31 in a shape as shown in FIG. 15 was made. In this case, a chromium film of 200 angstroms in thickness and a gold film of 5000 angstroms in thickness were formed at specified positions on a wafer of Z-plate of crystallized quartz of 0.3 mm in thickness by means of a sputtering method. Both faces of the wafer were coated with a resist and are provided with an external shape pattern of the vibrator by means of a photolithography method. At this time, a supporting hole pattern was not provided in a first embodiment, but was provided in a second embodiment.

This wafer was immersed in an aqueous solution of iodine and potassium iodide, an excessive part of the gold film was removed by etching, the wafer was further immersed in an aqueous solution of cerium-ammonium nitrate and perchloric acid, and an excessive part of the chromium film was etched off. The wafer was etched by immersing the wafer in ammonium bifluoride at a temperature of 80° C. for 20 hours to form the external shape of the vibrator. At this time, a supporting hole was not formed in the first embodiment, but was formed in the second embodiment. An aluminum film of 2000 angstroms in thickness was formed as an electrode film, using a metal mask.

Next, a driving vibration was generated by applying a voltage of 1.0 volt to an electrode of a vibrator having no supporting hole formed in it and distribution of the amplitude in each point on the vibrator was measured. The result is shown in Table 4.

TABLE 4

| Distance from a geometric center of the vibrator (mm) | Driving electrode (relative value) |
| --- | --- |
| 0.3 | 1 |
| 0.5 | 351370 |
| 1.0 | 708300 |
| 1.5 | 1453500 |
| 2.0 | 2302200 |
| 2.5 | 3277600 |
| 3.0 | 4693400 |
| 3.9 | 6061600 |
| 4.7 | 9829900 |
| 5.6 | 13470000 |
| 6.4 | 17304000 |
| 7.3 | 19615000 |
| 7.5 | 19851000 |
| 7.8 | 20617000 |
| 8.0 | 21169000 |
| 8.3 | 22703000 |

In this way, although the amplitude is remarkably small near the center of gravity GO of the vibrator, the amplitude is increased, for example, at a position 1.0 mm distant from the center of gravity. Due to this, there has been a possibility that the degree of influence exerted by a supporting means on the vibrator changes when the supporting position is slipped by a mechanical cause or a vibrating state is slightly changed due to a temperature change.

On the other hand, a vibrating state of a vibrator having a supporting hole formed in it was examined in the same way as described. Here, the supporting hole was formed into the shape of a circle of 0.3 mm in diameter. Distribution of the amplitude in each point on the vibrator was measured. The result is shown in Table 5.

TABLE 5

| Distance from a geometric center of the vibrator (mm) | Driving electrode (relative value) |
| --- | --- |
| 0.3 | 1200000 |
| 0.5 | 1197500 |
| 1.0 | 1213900 |
| 1.5 | 1728000 |
| 2.0 | 2519000 |
| 2.5 | 3467500 |
| 3.0 | 4869500 |
| 3.9 | 6228800 |
| 4.7 | 9994600 |
| 5.6 | 13639000 |
| 6.4 | 17473000 |
| 7.3 | 19784000 |
| 7.5 | 20021000 |
| 7.8 | 20787000 |
| 8.0 | 21339000 |
| 8.3 | 22872000 |

In this way, it is known that variation in amplitude is remarkably small, for example, within a range of 1.5 mm distant from the center of gravity.

A vibrator is fixed as shown in FIGS. 16 and 17, for example. A spacer 48, a control part 49 and a supporting jig 43 are put on a supporting stand 42. A vibrator 50 is put on the spacer 48 and a projection 43*c* of the jig 43 is inserted into a supporting hole 47 of the vibrator 50. A gap between the inner wall face of the supporting hole 47 and the projection 43*c* is filled with resin, solder, metalization or the like. Specified wires 46 are connected onto the control part 49, and the wires 46 are connected to a specified electrode pattern on the vibrator 50. And a fixing jig 45 projects from a fixing stand 44, and the vibrator 50 is mechanically fixed at a specified position on the spacer by the fixing jig 45.

In FIG. 18(*a*), projections 51A and 51B are arranged on the upside and downside of the vibrator 50 so as to put the supporting hole 47 between them, and the vibrator 50 is pressure-joined with the projections 51A and 51B in the vertical direction. In FIGS. 18(*b*) and 18(*c*), a pin 52*a* is provided on a projection 52 and a hole 53*a* is provided in another projection 53. The projections 52 and 53 are arranged above and below the vibrator 50 so as to put the supporting hole 47 between them, and the pin 52*a* is inserted into and through the supporting hole 47 and further inserted into the hole 53*a* and then the vibrator 50 is pressure-joined with the projections 52 and 53 in the vertical direction.

In FIG. 19(*a*), a projection 51 of a supporting means is arranged below the supporting hole 47 and the surface of the vibrator and the projection 51 are joined through a joining layer 54 with each other. In FIG. 19(*b*), projections 51A and 51B are arranged above and below the vibrator so as to put the supporting hole 47 of the vibrator between them, and a joining material 54 is filled into the supporting hole 47 and between the vibrator 50 and projections 51A and 51B to form a joining layer. And as shown in FIG. 19(*c*), a projection 52*a* of the supporting means 52 is inserted into and through the supporting hole 47*a* and a joining layer 54 is formed between an end face of the supporting means 52 and the vibrator 50 and between the projection 52*a* and the inner wall face of the supporting hole 47. And in FIG. 19(*d*), similarly to FIG. 18(*b*), a pin 52*a* is provided on a projection 52, a hole 53*a* is provided in another projection 53, the projections 52 and 53 are arranged above and below the vibrator 50 so as to put the supporting hole 47 between them, the pin 52*a* is inserted into and through the supporting hole 47, and further inserted into the hole 53*a*. And a joining material 54 is filled between the vibrator 50 and each end face of the supporting means 52 and 53 and between the projection 52a and the inner wall face of the supporting hole 47.

FIGS. 20 to 26 are examples where a plurality of holes are formed in a base part of a vibrator and one or plural holes out of the plurality of holes are used as supporting holes.

In a vibrator 61A of FIG. 20, eight holes 62A, 62B and 62C are provided so as to surround the centers of gravity GO and GD in a base part 60A. Among them, four holes 62A are provided at four corners of the base part 60A being in the shape of a quadrangle, and two holes 62B are between detecting vibration systems 40A, 40B and the centers of gravity GO, GD. Two holes 62C are between driving vibration systems 39A, 39B and the centers of gravity GO, GD. Preferably, the holes 62B are used as supporting holes as shown in this example. For example, as shown in FIG. 20(b), a supporting means 80 is provided. The supporting means 80 is provided with a supporting pole 81, an arm 82 projecting horizontally from the supporting pole 81, and two supporting projections 83. And the vibrator 61A is held by inserting the supporting projections respectively into the supporting holes 62B.

Figure 22:
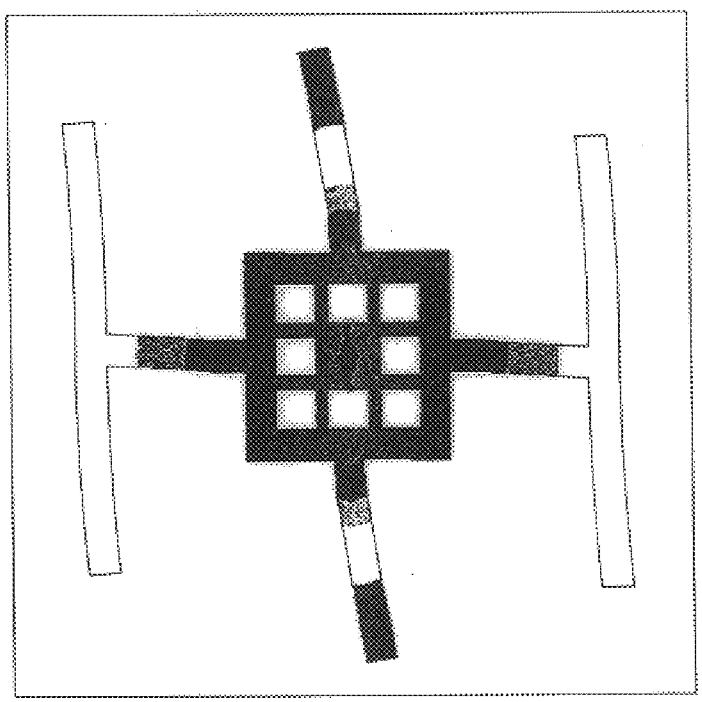
FIG. 22 is a color micrograph showing an example of a result of applying a natural mode analysis by a finite element method to a detecting vibration mode of the vibrator of FIG. 20.

FIG. 21 shows a relative ratio of the amplitude of vibration of each point in the vibrator 61A to the maximum vibration amplitude in a driving vibration mode, and FIG. 22 shows a relative ratio of the amplitude of vibration of each point in the vibrator to the maximum vibration amplitude in a detecting vibration mode. In FIGS. 21 and 22, the respective domains different in color from one another show domains each of whose colors represents the ratios. The domains being smallest in amplitude are indicated by orange.

The driving vibration systems and the detecting vibration systems are the same in operation as described above. However, the amplitude of each point in the base part 60A is greatly different in comparison with a case where there is no hole. That is to say, for example in FIG. 11, a domain where the detecting vibration is smallest in the base part 60A was nearly in the shape of a rhombus. In this example, however, since the holes 62B are provided in particular between the detecting vibration systems and the center of gravity, as shown in FIGS. 20 and 22, a domain 36C where the detecting vibration is smallest extends long and narrowly between the two detecting vibration systems 40A and 40B, and this domain 36C reaches the inner wall faces of the respective supporting holes 62B to be exposed. As the result, as shown in FIGS. 20(a) and 20(b), the domain where the detecting vibration is smallest comes to be directly supported by the projections 83.

As known from FIG. 21, a domain nearly in the shape of an octagon where the driving vibration is smallest is generated in the central part of each hole, and these domains surround said domain 36C. Therefore, the domain 36C is the overlapped domain.

Figure 23:
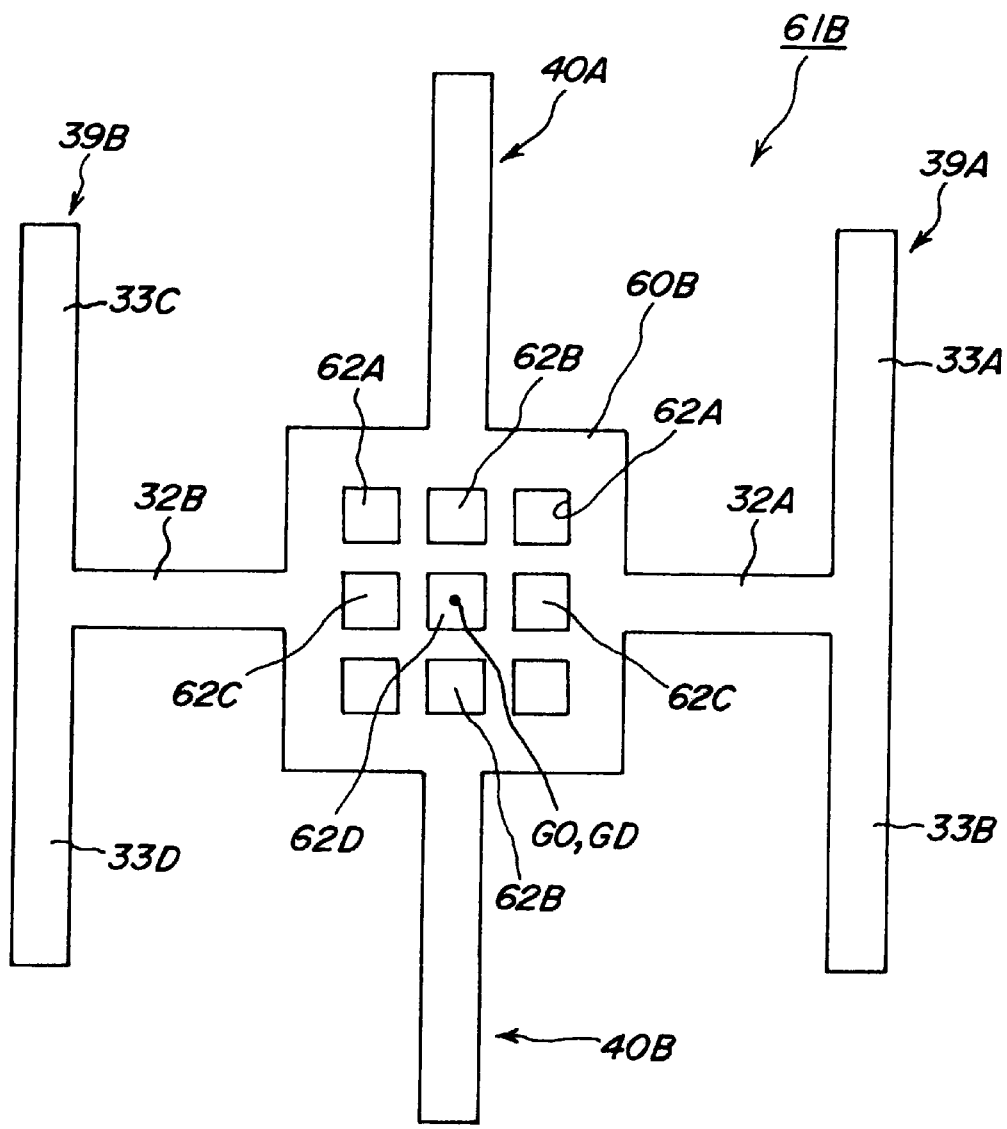
FIG. 23 is a front view showing a vibrator 61B having nine holes provided in its base part 60B.

In a vibrator 61B of FIG. 23, furthermore, a central hole 62D is formed in a base part 60B. In this case, it is preferable to support the hole 62D and/or the hole 62B.

Figure 24:
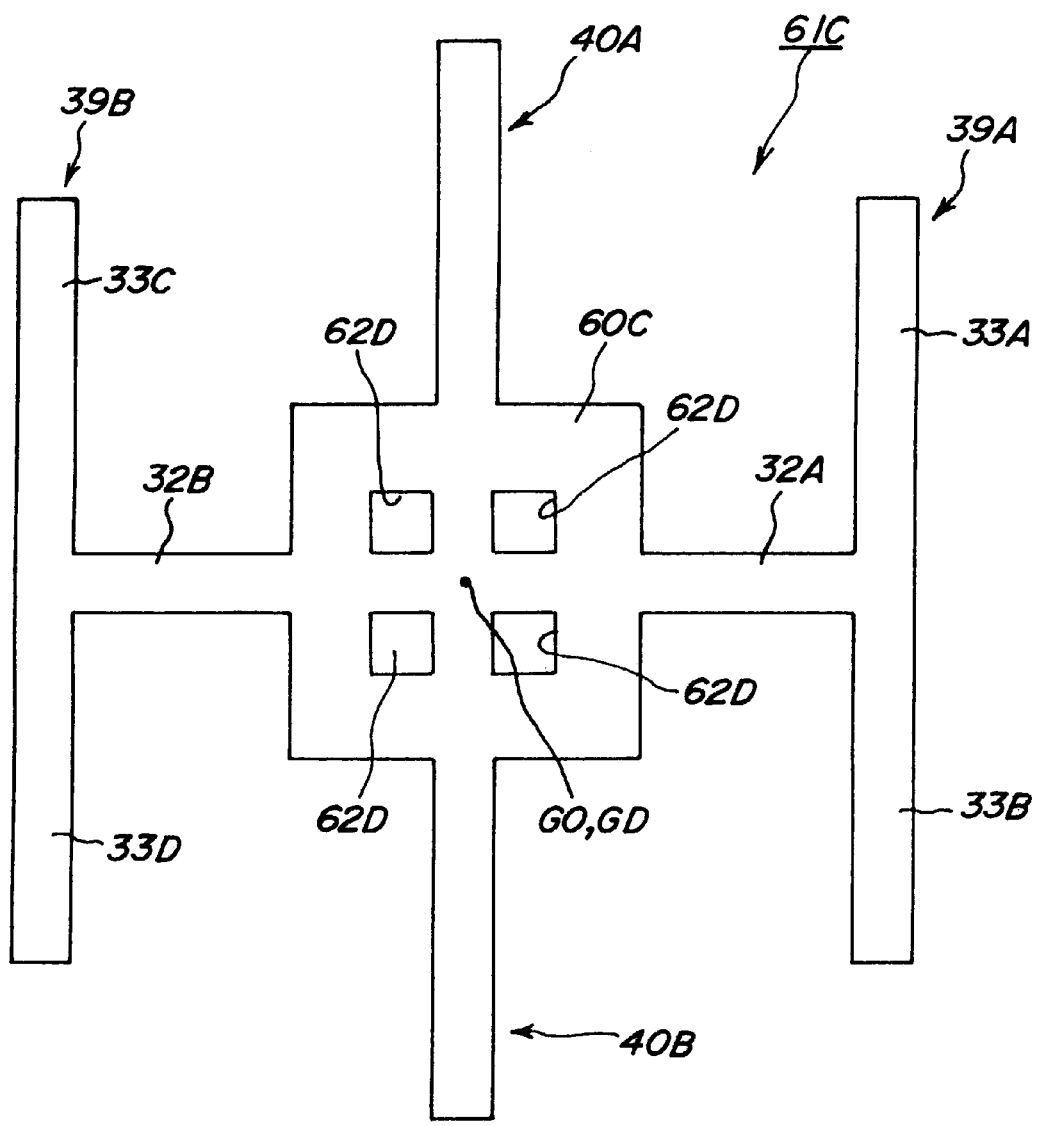
FIG. 24 is a front view showing a vibrator 61C having four holes provided in its base part 60C.

In a vibrator 61C of FIG. 24, four holes 62D are formed in a base part 60C. The respective holes 62D are formed so as to be tetrad-symmetric with respect to the center of gravity to surround the centers of gravity GO and GD. It is preferable to support two or more holes out of these holes.

Figure 25:
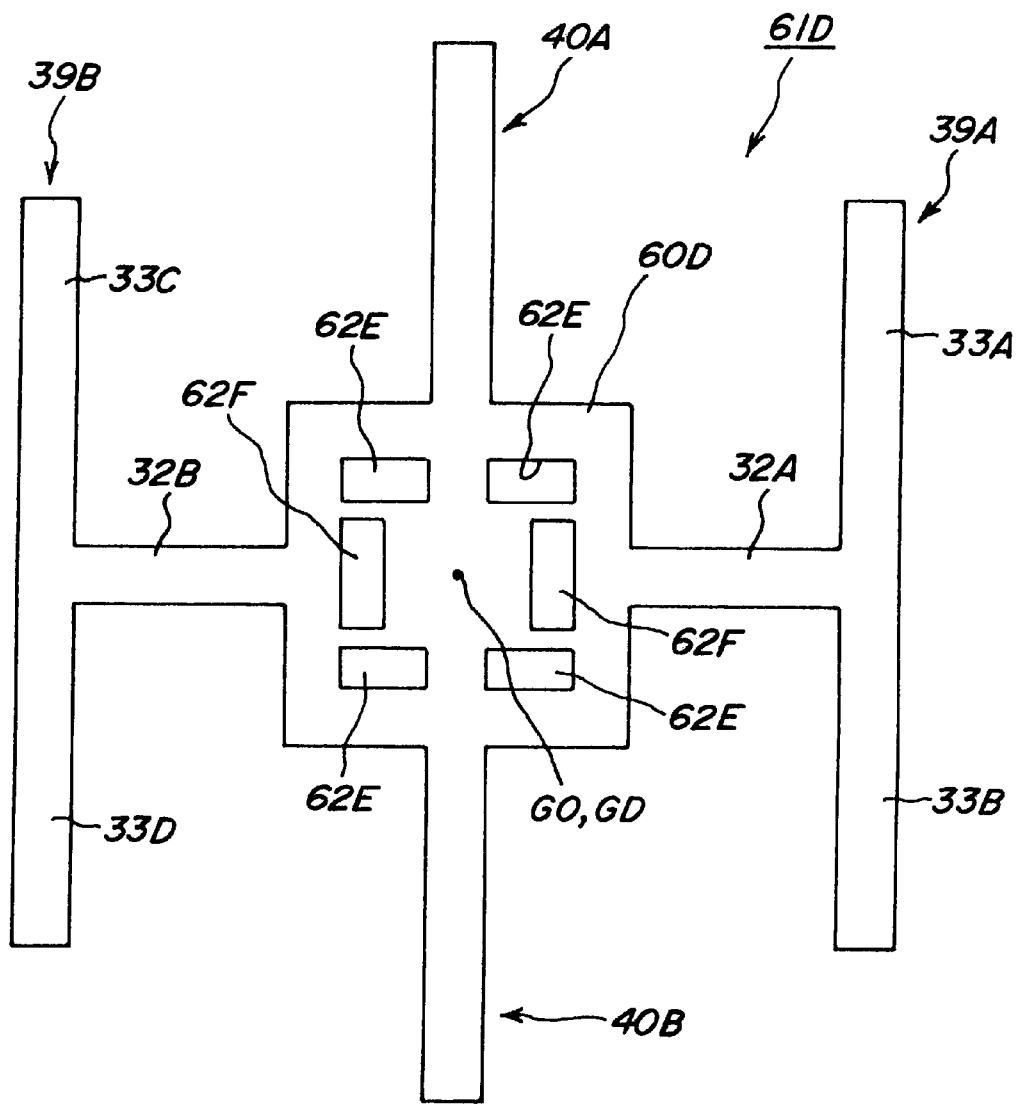
FIG. 25 is a front view showing a vibrator 61D having six holes provided in its base part 60D.

In a vibrator 61D of FIG. 25, six holes 62E and 62F are formed in a base part 60D. The holes 62E are between the center of gravity GO and the detecting vibration systems 40A, 40B. The two holes 62F are between the center of gravity GO and the driving vibration systems 39A, 39B. In this case, the vibrator can be supported with the four holes 62E, or can be supported with the two holes 62F. Due to providing a plurality of holes in the base part 62D, the respective amplitudes of the driving vibration and detecting vibration in the base part are changed and a domain where the detecting vibration is smallest and a domain where the driving vibration is smallest are wider in comparison with a case where the base part has no hole. Therefore, it is possible to support the vibrator at a domain where both domains overlap each other.

Figure 26:
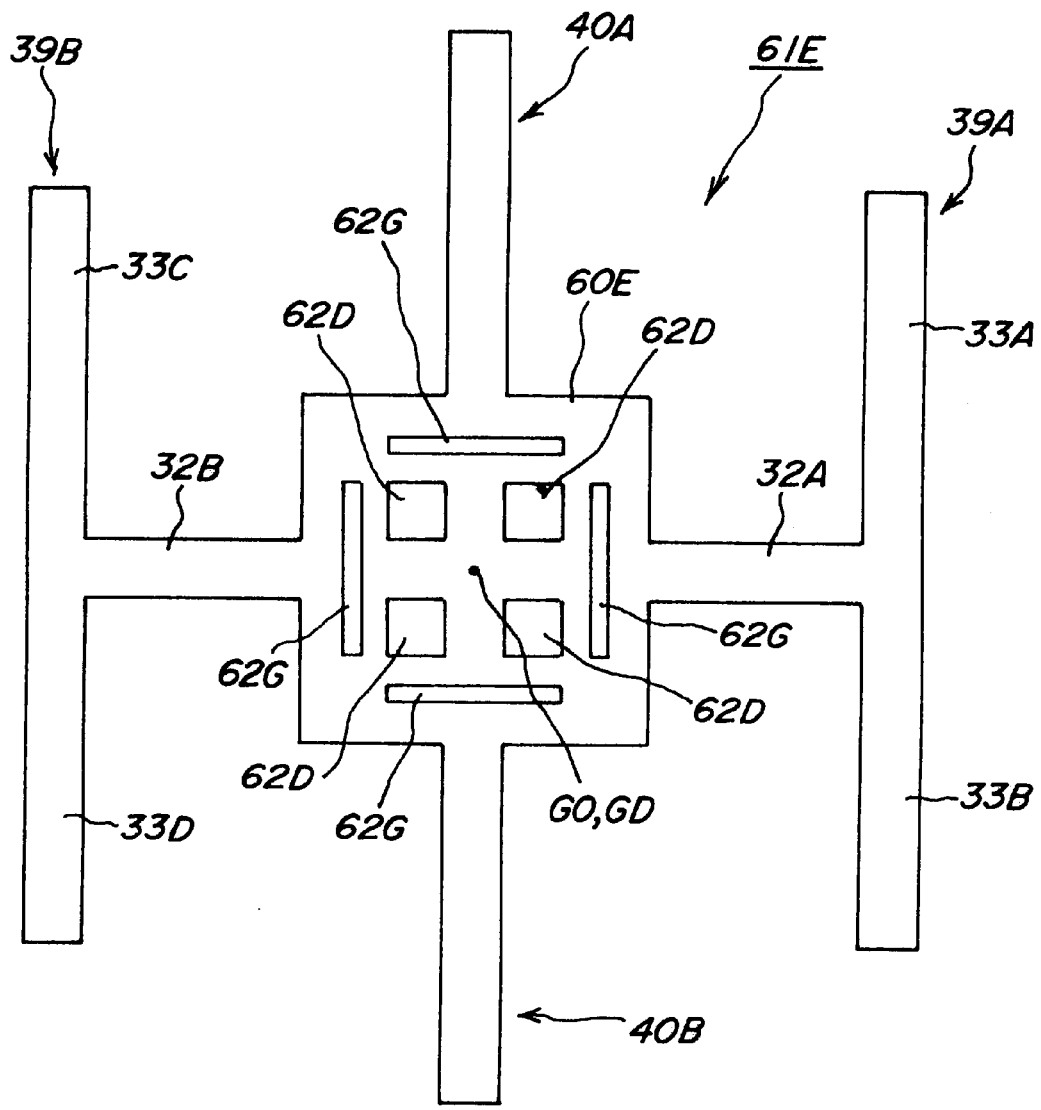
FIG. 26 is a front view showing a vibrator 61E having four holes 62D and four holes 62G provided in its base part 60E.

In a vibrator 61E of FIG. 26, four holes 62D are provided in a base part 60E. The holes 62D are formed so as to be tetrad-symmetric with respect to the center of gravity to surround the centers of gravity GO and GD. And long and narrow holes 62G are formed respectively outside the holes 62D. In this example, it is preferable to support two or four holes 62D and/or to support domains which are inner than the respective holes 62D and where the detecting vibration is smallest.

In the invention, an Adhesive portion may be sandwiched between the surface of a vibrator and the surface of a supporting member. Moreover, it is possible to use a supporting member having a fixing portion, to form a supporting hole or holes in a vibrator, to insert the fixing portion into the supporting hole and to place the adhesive portion between the inner wall of the supporting hole and the fixing portion, for supporting the vibrator. The above two supporting methods may preferably be carried out at the same time.

The fixing portion of the supporting member may be, but not limited to, a protrusion or rod-shaped body. The supporting hole may be so-called a blind hole and may preferably be a through hole. When the supporting hole is a blind hole, Such blind hole may preferably have a depth not less than ½ of the thickness of the vibrator. The domain where the amplitude of a detecting vibration is smallest covers a wider area in the inside of the vibrator than on the surface of the vibrator. Therefore, when the depth of the blind hole is not lower than ½ of the thickness of the vibrator, it is possible to effectively utilize the wider domain where the amplitude of a detecting vibration is smallest inside the vibrator.

When providing an adhesive portion, a one-part or two-part adhesive is filled in a predetermined portion by application or coating and cured. Further, when forming an adhesive layer having a substantially uniform thickness as shown in FIG. 19a, it is possible to form a plate-shaped adhesive layer by filling a liquid adhesive, such as a one-part or two part adhesive, into a mold and then interposing the plate shaped adhesive layer between a vibrator and supporting member for further curing the layer. In this case, a supporting hole 47, shown in FIG. 19a, may be omitted. By applying such forming process, it is possible to preserve the uniformity of the thickness and shape of the adhesive portion. The amplitude of a detecting vibration of a vibrator is generally very small and therefore may be considerably influenced by the shape and properties of the adhesive portion directly contacting the vibrator. Therefore, it is important to produce an adhesive portion with an uniform thickness as well as with uniform properties after curing, for improving the yield in manufacturing vibratory gyroscopes. The above forming process of the adhesive layer is very useful from the point of view.

When interposing an adhesive layer with a substantially uniform thickness between a vibrator and supporting member, the area of the layer may preferably be not less than 2 mm², for improving the fixing strength of the vibrator to minimize the influences externally applied on the vibrator. The area of the adhesive layer may preferably be not more than 10 mm², for improving the Q value of a detecting vibration.

The experimental results will be described.

A vibratory gyroscope shown in FIG. 9 was produced. A chromium film of 200 angstroms in thickness and a gold film of 5000 angstroms in thickness were formed on a wafer made of a Z-plate of quartz with a thickness of 0.3 mm, by means of sputtering. Both main faces of the wafer were coated with a resist film.

The resulting wafer was immersed in an aqueous solution of iodine and potassium iodide to remove excessive gold in the gold film by etching, and was further immersed in an aqueous solution of cerium-ammonium nitrate and perchloric acid to remove excessive chromium in the chromium film by etching. The wafer was etched by immersing the wafer in ammonium bifluoride at 80° C. for 20 hours to form the external shape of the vibrator as shown in FIG. 9. An aluminum film of 2000 angstroms in thickness was formed as an electrode film, using a metal mask.

The base part 38 of the thus obtained vibrator has dimensions of 6.0 mm×6.0 mm. Each detecting part 33A, 33B, 33C or 33D has a width of 1.0 mm and a length of 6.0 mm. Each detecting electrode 34A, 34B, 34C or 34D has a width of 0.6 mm and a length of 2.8 mm. The electrode is provided from a position 1.2 mm distant to a position 4.0 mm distant from the root of each of the detecting parts 33A to 33D.

As shown in FIG. 19c, a supporting hole 47 with a square shape of 0.75 mm×0.75 mm in the central portion of the vibrator 50. A metal supporting member (protrusion) 52 has a cylindrical-shaped metal pin 52a with a diameter of 0.6 mm on its upper end. The metal pin 52a is inserted through the hole 47. An adhesive is applied between the inner wall of the vibrator 50 and the outer surface of the metal pin 52a, and applied between the main faces of the vibrator and the upper end surface of the supporting member 52, for fixing the vibrator to the supporting member. Each adhesive shown in table 6 was used.

TABLE 6

| | Chemical name of an adhesive | Type of an adhesive Used |
|---|---|---|
| Example 1 | silicone RTV rubber | one-part alcohol-liberating type |
| Example 2 | silicone rubber | heat-cured, addition reaction type |
| Example 3 | silicone RTV rubber | two-part condensation reaction |
| Example 4 | silicone gel | addition reaction type |
| Example 5 | silicone RTV rubber | one-part alcohol-liberation type |
| Example 6 | silicone RTV rubber | One-part alcohol-liberation type |
| Example 7 | silicone gel | Addition reaction type |
| Example 8 | epoxy adhesive | One-part heat-curing type |
| Comparative Example 1 | epoxy adhesive | Two-part heat-curing type |
| Comparative Example 2 | a polymer containing silyl groups | |
| Comparative Example 3 | Epoxy-denaturation Polyamine | |
| Comparative Example 4 | Silicone RTV rubber | One-part alcohol-Liberation type |

The maximum and minimum values of tan δ of each adhesive between −40° C. to +80° C. are shown in FIG. 7. The frequency dependence of electrical impedances between the driving electrodes and between the detecting electrodes were measured to estimate the sharpnesses of resonance (Q value) of the driving and detection vibration modes, respectively, which were shown in FIG. 7.

TABLE 7

| | Specific gravity of adhesive | Maximum value of tan δ of adhesive | Minimum value of tan δ of adhesive | Maximum of Q value of detecting Vibration | Minimum of Q value of detecting vibration |
|---|---|---|---|---|---|
| Example 1 | 1.04 | 0.1 | 0.1 | 18050 | 18045 |
| Example 2 | 1.03 | 0.07 | 0.05 | 18160 | 18070 |
| Example 3 | 1.01 | 0.04 | 0.04 | 18195 | 18180 |
| Example 4 | 1.09 | 0.08 | 0.08 | 18060 | 18055 |
| Example 5 | 1.03 | 0.07 | 0.02 | 20250 | 18080 |
| Example 6 | 1.05 | 0.03 | 0.03 | 20180 | 20150 |
| Example 7 | 1.04 | 0.00 | 0.00 | 20350 | 20325 |
| Example 8 | 1.2 | 0.06 | 0.05 | 15250 | 15150 |
| Comparative Example 1 | 1.05 | 0.11 | 0.11 | 328 | 315 |
| Comparative Example 2 | 1.04 | 0.15 | 0.07 | 1806 | 310 |
| Comparative Example 3 | 1.06 | 0.17 | 0.15 | 309 | 313 |
| Comparative Example 4 | 1.2 | 0.16 | 0.15 | 313 | 310 |

As described above, when adhering a vibrator onto a supporting portion, the inventive vibratory gyroscope may be useful to reduce the deviation of Q value, responsive to temperature change, of the detecting vibration excited in the vibrator and to reduce the temperature-dependent change of the performance the gyroscope.

What we claim is:

1. A vibratory gyroscope for detecting a turning angular rate of rotation applied to a vibrator in a predetermined temperature range, wherein said vibratory gyroscope comprises a vibrator, a supporting member for supporting said vibrator and an adhesive portion made of an adhesive provided between said supporting member and said vibrator for bonding said vibrator to said supporting member, said vibratory gyroscope detects a turning angular rate based on a detecting vibration excited in said vibrator responsive to said rotation when a driving vibration is excited in said vibrator, and said adhesive has a tan δ not higher than 0.1 within said predetermined temperature range.

2. The vibratory gyroscope of claim 1, wherein said tan δ of said adhesive is not higher than 0.03 within said predetermined temperature range.

3. The vibratory gyroscope of claim 1, wherein a difference between a maximum value and a minimum value of said tan δ of said adhesive in said temperature range is not higher than 0.03.

4. The vibratory gyroscope of claim 1, wherein said adhesive has a specific gravity of not higher than 1.1.

5. The vibratory gyroscope of claim 4, wherein said adhesive contains a filler in an amount of not more than 7 weight percent, based on a total weight of said adhesive.

6. The vibratory gyroscope of claim 1, wherein said adhesive is selected from the group consisting of a silicone rubber, a silicone gel, a silicone resin, an ethylene-propylene rubber, a butyl rubber, an urethane rubber, a fluoride resin, a vinyl chloride resin, "Nylon" and a polyethylene.

7. The vibratory gyroscope of claim 6, wherein said adhesive is said silicone rubber.

8. The vibratory gyroscope of claim 7, wherein said silicone rubber is selected from the group consisting of alcohol-liberating type, acetone-liberating type, oxime-liberating type, acetic acid- liberating type and addition reaction type of silicone rubbers.

9. The vibratory gyroscope of claim 1, wherein said dynamic modulus of elasticity in a range of $10^2$ to $10^{10}$ Pa.

10. The vibratory gyroscope of claim 9, wherein a maximum value of said dynamic modulus of elasticity of said adhesive within said temperature range is not more than 3 fold of a minimum value of said dynamic modulus of elasticity of said adhesive in said temperature range.

11. The vibratory gyroscope of claim 1, wherein said adhesive has a dynamic loss in a range off $10^1$ to $10^8$ Pa.

12. The vibratory gyroscope of claim 1, wherein said adhesive portion has a thickness of not lower than 0.05 mm.

13. The vibratory gyroscope of claim 12, wherein said adhesive portion has a thickness of not higher than 0.4 mm.

14. The vibratory gyroscope of claim 1, wherein said temperature range is −40° C. to +85° C.

15. The vibratory gyroscope of claim 1, wherein said vibrator is supported within a domain where said detecting vibration is smallest in said vibrator.

16. The vibratory gyroscope of claim 15, wherein said domain where said detecting vibration is smallest overlaps with a domain where said driving vibration is smallest in said vibrator.

17. The vibratory gyroscope of claim 1, wherein said vibrator is supported at a position on or near a center of gravity of said vibrator.

18. The vibratory gyroscope of claim 15, wherein said vibrator is supported at a position on or near a center of gravity of said vibrator.

19. The vibratory gyroscope of claim 1, wherein said vibrator is made of a piezoelectric single crystal.

20. The vibratory gyroscope of claim 1, wherein said vibrator is provided with a supporting hole and said vibrator is supported with or in the vicinity of said supporting hole.

21. The vibratory gyroscope of claim 20, wherein said supporting member has a protrusion inserted within said supporting hole, and said adhesive portion is provided between an inner wall of said vibrator hole and a surface of said protrusion.

22. The vibratory gyroscope as defined in claim 20, wherein said supporting hole is a through hole.

23. The vibratory gyroscope of claim 20, wherein a center of gravity of said vibrator is located within said supporting hole.

24. The vibratory gyroscope of claim 15, wherein said vibrator is provided with a supporting hole and said vibrator is supported with or in the vicinity of said supporting hole.

25. The vibratory gyroscope of claim 24, wherein said supporting member has a protrusion inserted within said supporting hole, and said adhesive portion is provided between an inner wall of said vibrator hole and a surface of said protrusion.

26. The vibratory gyroscope as defined in claim 24, wherein said supporting hole is a through hole.

27. The vibratory gyroscope as defined in claim 24, wherein a center of gravity of said vibrator is located within said supporting hole.

28. The vibratory gyroscope as defined in claim 1, wherein said adhesive portion is made of a plate shaped adhesive layer, said adhesive layer having a substantially uniform thickness.

29. The vibratory gyroscope as defined in claim 28, wherein said plate shaped adhesive layer is preformed before inserting said layer between said supporting member and said vibrator.

30. A vibratory gyroscope for detecting a turning angular rate of rotation applied to a vibrator, wherein said vibratory gyroscope comprises a vibrator, a supporting member for supporting said vibrator and an adhesive portion made of an adhesive provided between said supporting member and said vibrator for bonding said vibrator to said supporting member, said vibratory gyroscope detects a turning angular rate based on a detecting vibration excited in said vibrator responsive to said rotation when a driving vibration is excited in said vibrator, and the three dimensional center of gravity of said vibrator is located in a supporting region of said vibrator.

31. A vibratory gyroscope for detecting a turning angular rate of rotation applied to a vibrator, wherein said vibratory gyroscope comprises a vibrator, a supporting member for supporting said vibrator and an adhesive portion made of an adhesive provided between said supporting member and said vibrator for bonding said vibrator to said supporting member, said vibratory gyroscope detects a turning angular rate based on a detecting vibration excited in said vibrator responsive to said rotation when a driving vibration is excited in said vibrator, and a three dimensional center of gravity of said vibrator is located within one of said supporting member and said adhesive portion.

32. A method for analyzing vibration of a vibrator that includes a plurality of vibration pieces connected to a base part, comprising the steps of:

applying a driving vibration to at least one of the vibration pieces to allow a detecting vibration to occur in the vibrator;

computing amplitude ratios of the detecting vibration along each point of the vibrator to a maximum amplitude of the detecting vibration in the vibrator, by means of a natural mode analysis by a finite element method; and using the computed ratios to detect a domain within the vibrator where the detecting vibration is smallest and in the vicinity of a center of gravity of said vibrator.

33. The method of claim 32, wherein said driving vibration is predetermined and said method further comprises:

computing the ratio of the amplitude of a driving vibration along each point of the vibrator to the maximum amplitude of the driving vibration in the vibrator, by means of a natural mode analysis by a finite element method; and using the computed ratios to detect a domain within the vibrator where the driving vibration is smallest.

* * * * *

UNITED STATES PATENT AND TRADEMARK OFFICE
CERTIFICATE OF CORRECTION

PATENT NO.     : 6,651,498 B1
DATED          : November 25, 2003
INVENTOR(S)    : Takayuki Kikuchi et al.

It is certified that error appears in the above-identified patent and that said Letters Patent is hereby corrected as shown below:

<u>Title page,</u>
Item [30], Foreign Application Priority Data, please change "10-188563" to -- 11-188563 --

<u>Column 1,</u>
Line 27, please change "before" to -- before, --
Line 43, please change "ω" to -- (ω) --

<u>Column 2,</u>
Line 40, please change "a" (second occurrence) to -- high --

<u>Column 3,</u>
Line 12, please change "hole the" to -- hole. The --
Line 16, please change "pieces and the" to -- pieces. The --
Line 37, please change "result" to -- result, --

<u>Column 8,</u>
Line 13, please change "18(a) after 18(b)" to -- 18(a), 18(b) and 18(c) --

<u>Column 10,</u>
Line 65, please delete "more"

<u>Column 21,</u>
Line 12, please change "off" to -- of --

<u>Column 22,</u>
Line 18, please change "the" to -- a --

Signed and Sealed this

Twentieth Day of January, 2004

JON W. DUDAS
*Acting Director of the United States Patent and Trademark Office*